United States Patent [19]
Yazawa et al.

[11] Patent Number: 5,195,129
[45] Date of Patent: Mar. 16, 1993

[54] SWITCHING SYSTEM FOR APPLICATION SERVICES

[75] Inventors: Shigehiko Yazawa; Tsuyoshi Kanai; Hideo Tachieda; Naoto Tada, all of Kawasaki; Norihiro Aritaka, Yokohama; Masatomo Yazaki, Sagamihara, all of Japan

[73] Assignee: Fujitsu Limited, Kawasaki, Japan

[21] Appl. No.: 613,690

[22] PCT Filed: Mar. 15, 1990

[86] PCT No.: PCT/JP90/00344

§ 371 Date: Nov. 20, 1990

§ 102(e) Date: Nov. 20, 1990

[87] PCT Pub. No.: WO90/11660

PCT Pub. Date: Oct. 4, 1990

[30] Foreign Application Priority Data

Mar. 20, 1989 [JP] Japan ............................ 1-67859
Mar. 20, 1989 [JP] Japan ............................ 1-67860
Jun. 30, 1989 [JP] Japan ............................ 1-170769

[51] Int. Cl.$^5$ ............................ H04M 11/00
[52] U.S. Cl. ............................ 379/96; 379/157; 379/201
[58] Field of Search ............... 379/67, 88, 157, 354, 379/201, 396, 96, 97

[56] References Cited

U.S. PATENT DOCUMENTS

| | | | |
|---|---|---|---|
| 4,291,198 | 9/1981 | Anderson et al. | 379/96 |
| 4,665,545 | 5/1987 | Galensky et al. | 379/157 |
| 4,763,350 | 8/1988 | Immendorfer et al. | 379/67 |
| 4,776,005 | 10/1988 | Petriccione et al. | 379/96 |
| 4,790,003 | 12/1988 | Kepley et al. | 379/88 |
| 4,837,807 | 6/1989 | Szeto et al. | 379/96 |

FOREIGN PATENT DOCUMENTS

| | | | |
|---|---|---|---|
| 46699/85 | 3/1986 | Australia | 379/67 |
| 58-107759 | 6/1983 | Japan . | |
| 59-110250 | 6/1984 | Japan . | |
| 59-144263 | 8/1984 | Japan . | |
| 2-210998 | 8/1990 | Japan | 379/201 |
| 8707801 | 12/1987 | World Int. Prop. O. | 379/88 |

Primary Examiner—James L. Dwyer
Assistant Examiner—Wing F. Chan
Attorney, Agent, or Firm—Staas & Halsey

[57] ABSTRACT

A switching system for application services is provided with a terminal. At least one application processor stores a plurality of application programs for providing a plurality of the application services. Switching equipment couples the terminal to the application processor. The terminal has a specifying means for specifying one arbitrary application service out of the plurality of application services. When a user specifies the one arbitrary application service using the specifying means of the terminal, this information is transmitted to a common control unit of the switching equipment. The common control unit receives the application service specifying information from the terminal, and transfers this application specifying information to the application processor. The application processor selects the one arbitrary application service based on the application service specifying information which is transferred from the switching equipment.

11 Claims, 19 Drawing Sheets

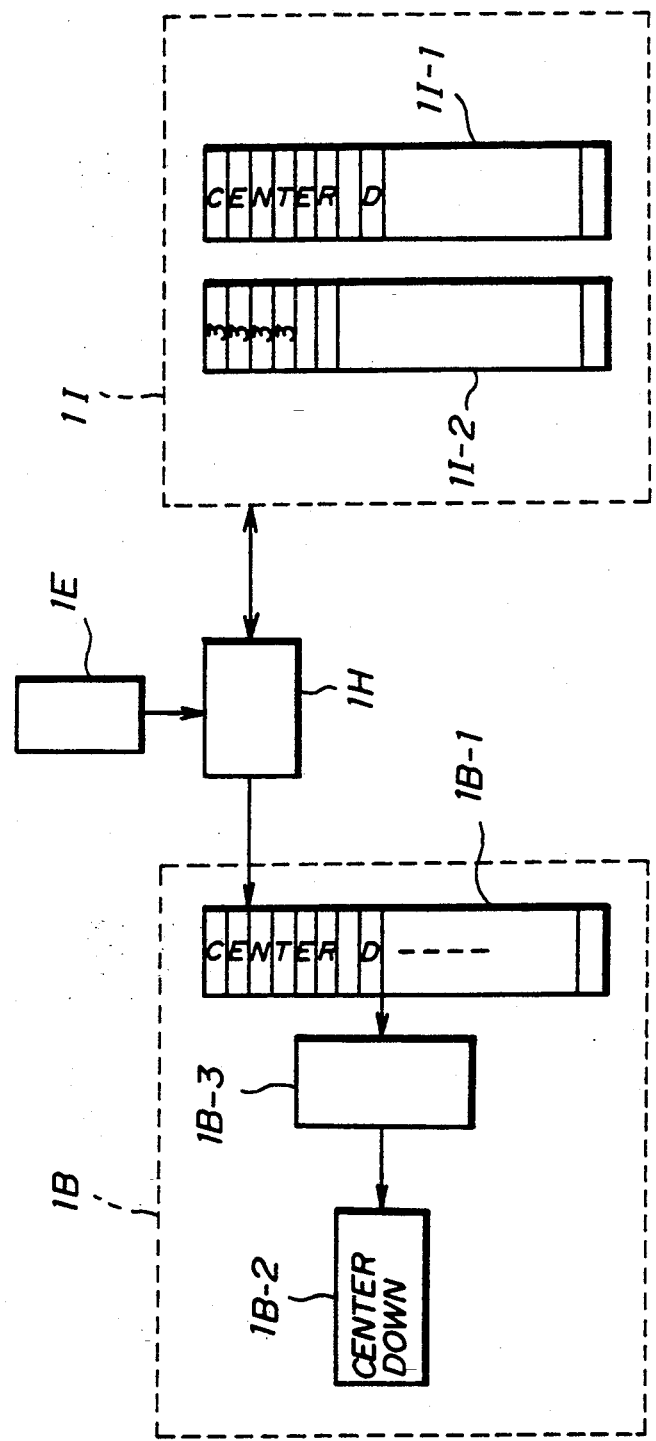

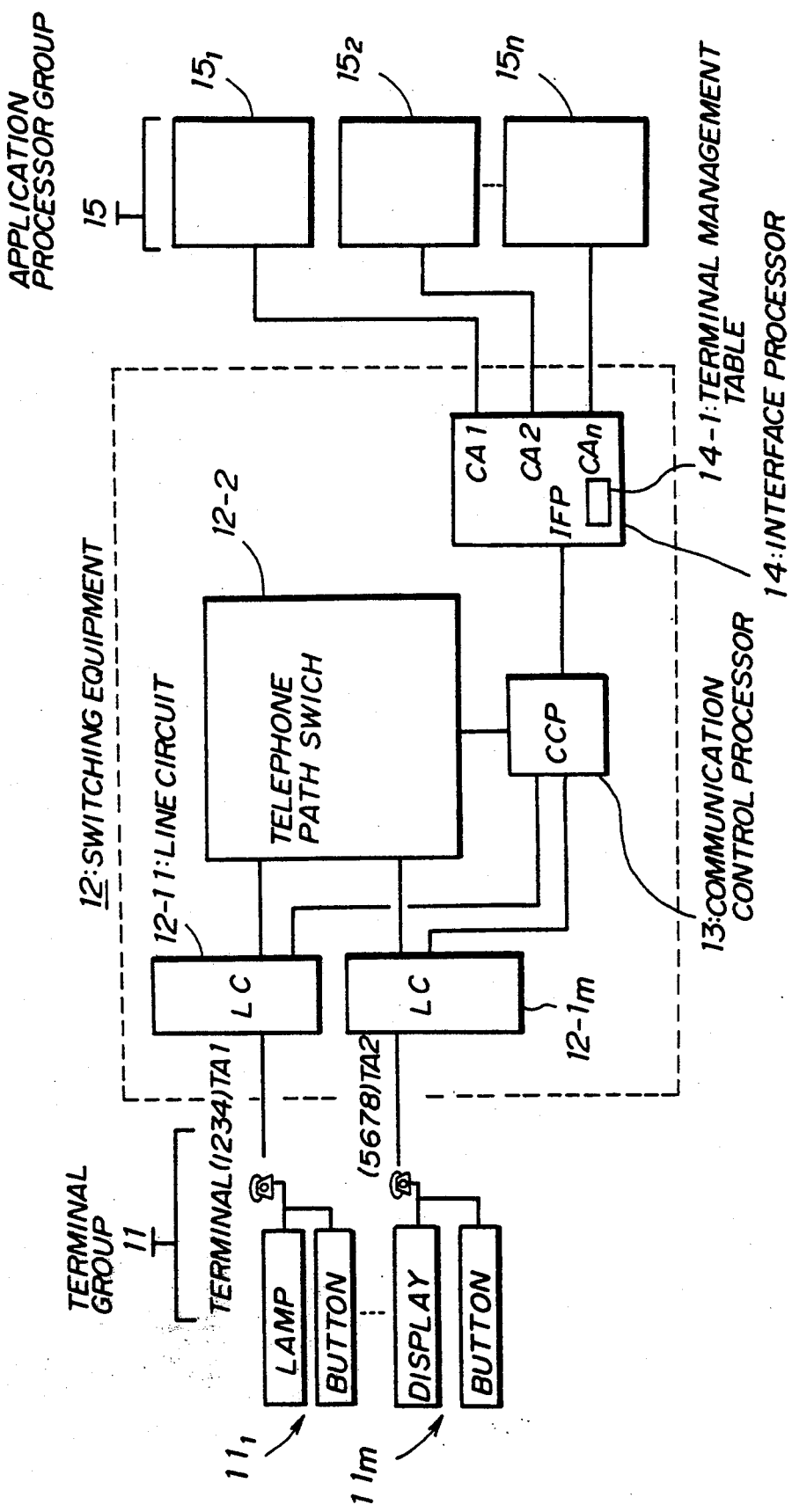

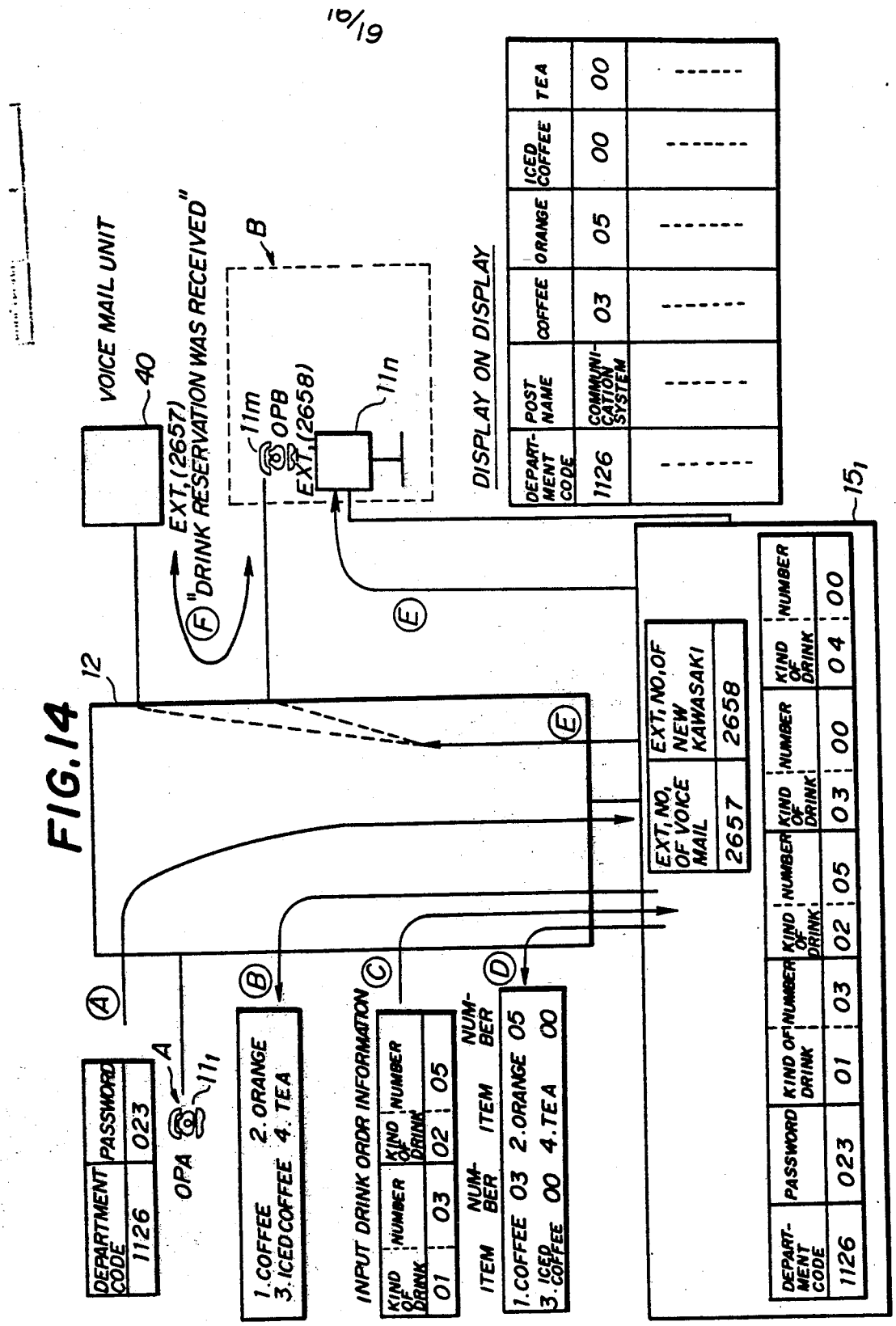

5,195,129

SWITCHING SYSTEM FOR APPLICATION SERVICES

BACKGROUND OF THE INVENTION

1. Technical Field

The present invention generally relates to switching systems for application services, and more particularly to a switching system for application services including a switching equipment which is coupled to terminals such as telephone sets with displays and an external application processor which is coupled to this switching equipment and stores programs for the application services.

2. Background Art

In a switching system for application services, a user makes access to an external application processor from a telephone set via a switching equipment by manipulating keys of the telephone set in a certain manner. Thus, the user can receive an application service which is provided by the external application processor. As examples of the application services, there are message display service, conference room reserving service, air conditioning control service, illumination control service and the like.

FIG. 1 generally shows an example of a conventional switching system for application services. In FIG. 1, the switching system for application services includes a digital telephone set 1 having a display, a line circuit 2, a switching equipment 3 and an external application processor 4. The telephone set 1 includes a handset 1A having transmitter/receiver functions, a display 1B for displaying various messages, a dial button group (key pad) 1C including a plurality of key buttons which are assigned numbers and predetermined symbols, and an application key button 1D which is used when receiving an application service.

FIG. 2 shows the telephone set 1 and the line circuit 2 in more detail. In FIG. 2, a line terminating part 1E of the telephone set 1 separates and integrates audio signals and control signals. With regard to the audio signals, the signal transmission and reception are made between the line terminating part 1E and the handset 1A via a coder/decoder 1F and a telephone circuit 1G of the telephone set 1. With regard to the control signals, the signal transmission and reception are made between the line terminating part 1E and a controller 1H of the telephone set 1. The control signals include a signal for providing the application service.

The display 1B, the dial key button group 1C, the application key button 1D, a memory 1I and a hook switch 1J are connected to the controller 1H. The controller 1H can transmit signals to and receive signals from the display 1B, the dial key button group 1C, the application key button 1D, a memory 1I and a hook switch 1J.

The memory 1I stores programs which are required for processings in the controller 1H and transmission and reception data. The hook switch 1J detects an off-hook state and an on-hook state of the handset 1A.

The telephone set 1 is coupled to the switching equipment 3 via the line circuit 2. In other words, a driver 1K and a receiver 1L which are provided as transmitter/receiver part of the telephone set 1 are coupled to a corresponding receiver 2A and a corresponding driver 2B of the line circuit 2. The receiver 2A and the driver 2B are terminated at a line terminating part 2C. The audio signals and the control signals are separated and integrated in the line terminating part 2C, and the audio signals are transmitted to a network part 3A of the switching equipment 3. The control signals are transmitted to a common control unit 3B of the switching equipment 3 via an interface circuit 2D.

Frames which are transmitted between the digital telephone set 1 and the line circuit 2 have a structure in which audio bits V0 through V7 are inserted between a frame bit F and a control bit S, for example.

The external application processor 4 which stores a program for a predetermined application service is coupled to the common control unit 3B of the switching equipment 3. As application services, it is possible to consider message display service, air conditioning control service, illumination control service and the like, but the service is limited to one. That is, the external application processor 4 stores only the program for a specific application service.

Next, a description will be given of a procedure for carrying out the application service, by referring to FIG. 3. First, the user at the telephone set 1 pushes the application key button 1D, so that the application key button pushed information is transmitted from the telephone set 1 to the common control unit 3B of the switching equipment 3. When the common control unit 3B of the switching equipment 3 receives the application key button pushed information, an application service start is transmitted to the external application processor 4. Accordingly, the display information from the external application processor 4 related to a predetermined procedure, comments and the like is returned to the telephone set 1 via the common control unit 3B of the switching equipment 3. As a result, the above display information is displayed on the display 1B of the telephone set 1.

Thereafter, the user pushes the dial key button depending on the display information. The key information is transmitted to the external application processor 4 via the common control unit 3B of the switching equipment 3. Hence, it is possible to receive the application service which is provided by the external application processor 4.

Then, when the user pushes the application key button 1D, this information is transmitted from the telephone set 1 to the common control unit 3B of the switching equipment 3, and the common control unit 3B of the switching equipment 3 gives an application service connection release instruction.

However, according to such a conventional switching system for application services, the external application processor only stores the program for a specific application service. For this reason, when starting the external application processor from the telephone set so as to receive the application service, the application which is started is limited to one. Accordingly, there are problems in the switching system for application services from the point of view of added value.

As shown in FIG. 4, the display 1B includes a display memory 1B-1 for temporarily storing the display information, a display panel 1B-2 for displaying the display information, and a display controller 1B-3 for controlling the display. Only the data related to the present display content is stored in the display memory 1B-1. When new display information is input, the content of this memory 1B-1 is renewed by the new content. In FIG. 4, those parts which are the same as those corresponding parts in FIGS. 1 and 2 are designated by the same reference numerals, and a description thereof will be omitted.

Therefore, in the conventional switching system for application services, when a call is received from another line while the message for the application service is being displayed, the display information for call control such as the number of the caller is displayed on the display panel 1B-2 of the display 1B in place of the message display for the application service. As a result, the message display for the application service disappears, and there is a problem in that this message display cannot be displayed again.

DISCLOSURE OF THE INVENTION

Accordingly, it is a general object of the present invention to provide a novel and useful switching system for application services in which the problems described above are eliminated.

Another and more specific object of the present invention is to provide a switching system for application services comprising a terminal, at least one application processor which stores a plurality of application programs for providing a plurality of application services, and switching equipment for coupling the terminal and the application processor, where the terminal includes specifying means for specifying one arbitrary application service out of the plurality of application services. According to the present invention, the added value of the switching system for application services is greatly improved.

Still another object of the present invention is to provide the switching system for application services wherein the terminal includes a display, a first memory area for storing display information for application service, a second memory area for storing display information for call control, display switching means for switching a display between the display for application service and the display for call control, and selective storage means, the switching equipment includes display identification information adding means for adding display identification information which identifies whether the display information to be displayed on the display is the display information for application service or the display information for call control, and the selective storage means stores the display information for application service in the first memory area and stores the display information for call control in the second memory area based on the display identification information transmitted from the switching equipment. According to the present invention, even when a call is received from another line while a message for application service is being displayed and there is a need to display two kinds of displays, it is possible to selectively display either one, and in addition, it is possible to again display the previously displayed message.

A further object of the present invention is to provide the switching system for application services wherein a plurality of application processors are provided, and there is further provided an interface processor which exclusively controls connection between the terminal and the plurality of application processors. According to the present invention, it is possible to improve the processing capability of the switching system for application services which is connected to the switching equipment and the plurality of application processors, because the exclusive control can be carried out between the terminal and the plurality of application processors.

Other objects and further features of the present invention will be apparent from the following detailed description when read in conjunction with the accompanying drawings.

BRIEF DESCRIPTION OF THE DRAWINGS

FIG. 10A, 10B and 10C respectively are diagrams for explaining an operation of the second embodiment;

FIG. 11 is a block diagram showing a third embodiment of the switching system for application services according to the present invention;

FIG. 14 is a general block diagram for explaining a particular service control procedure of an application service.

DETAILED DESCRIPTION OF THE PREFERRED EMBODIMENTS

Figure 1:
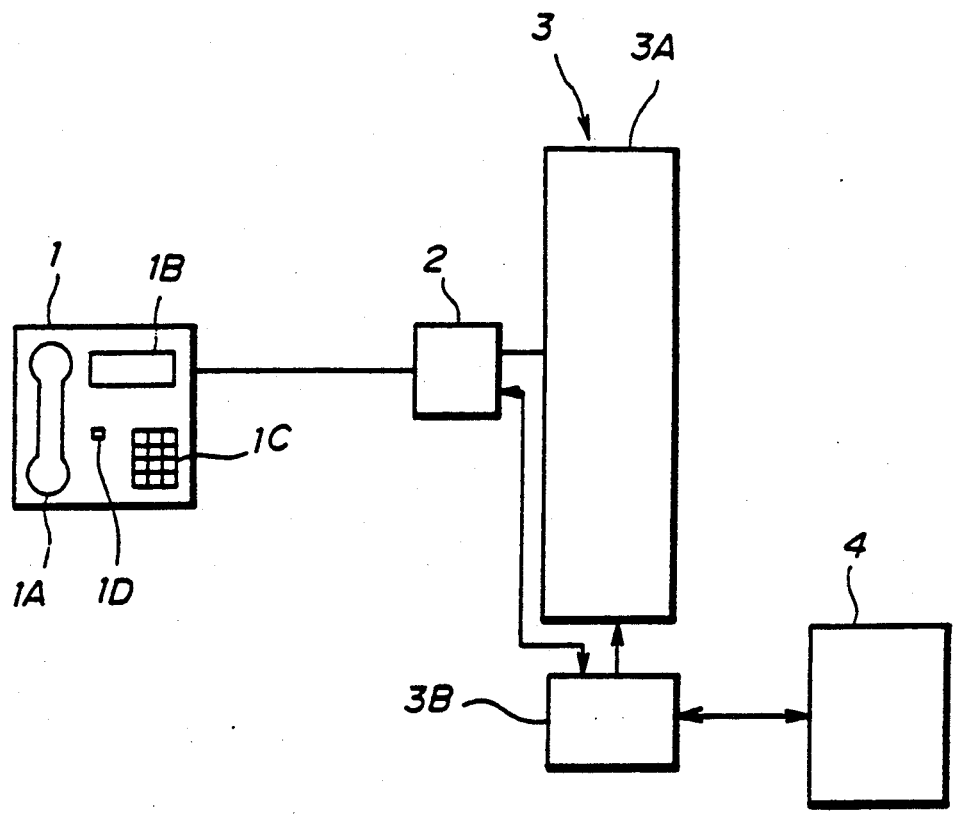
FIG. 1 is a block diagram showing an example of a conventional switching system for application services.
Figure 2:
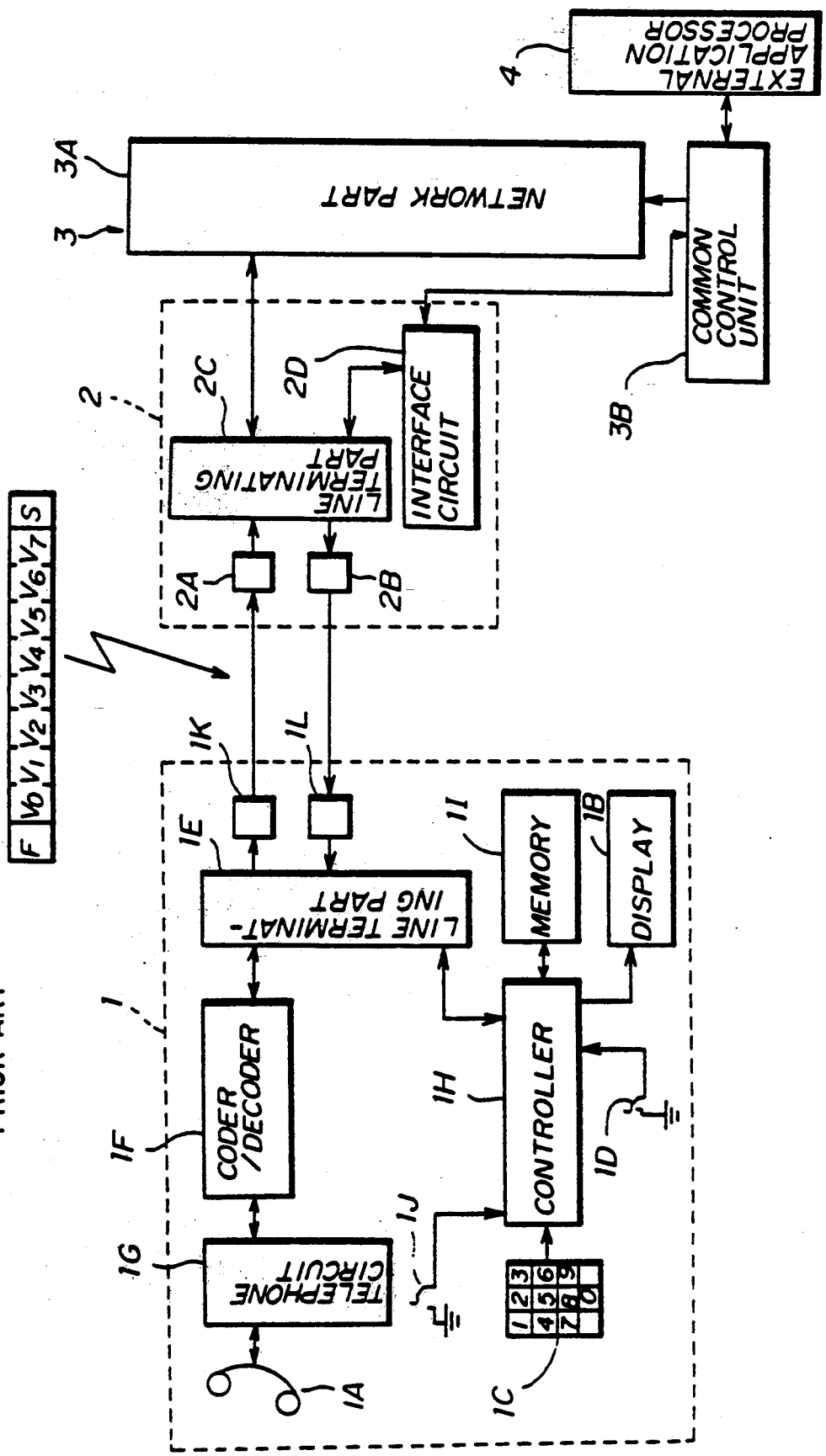
FIG. 2 is a block diagram showing a telephone set and a line circuit which are shown in FIG. 1 in more detail.
Figure 3:
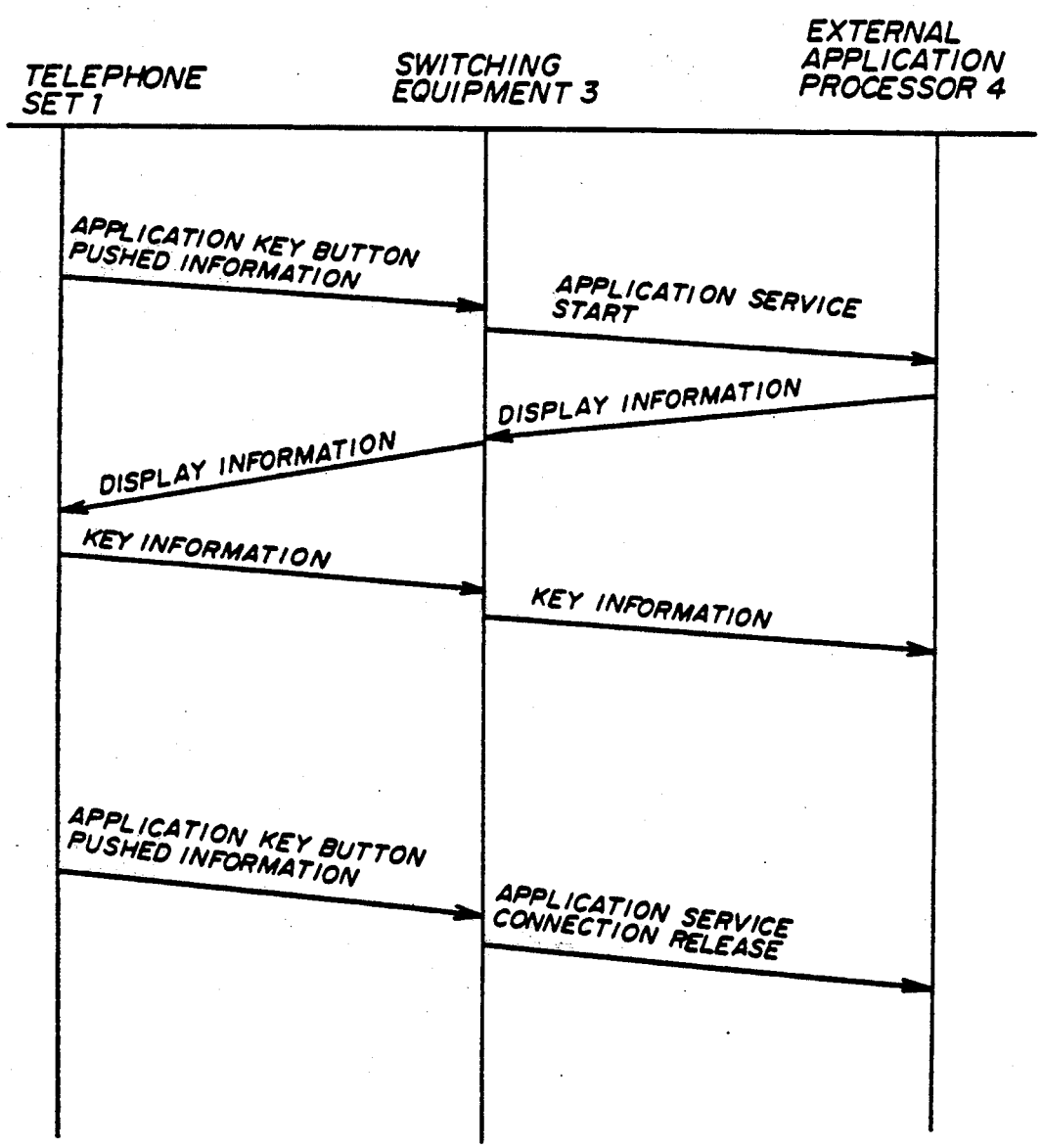
FIG. 3 is a time chart for explaining an operation of the conventional system shown in FIG. 1.
Figure 4:
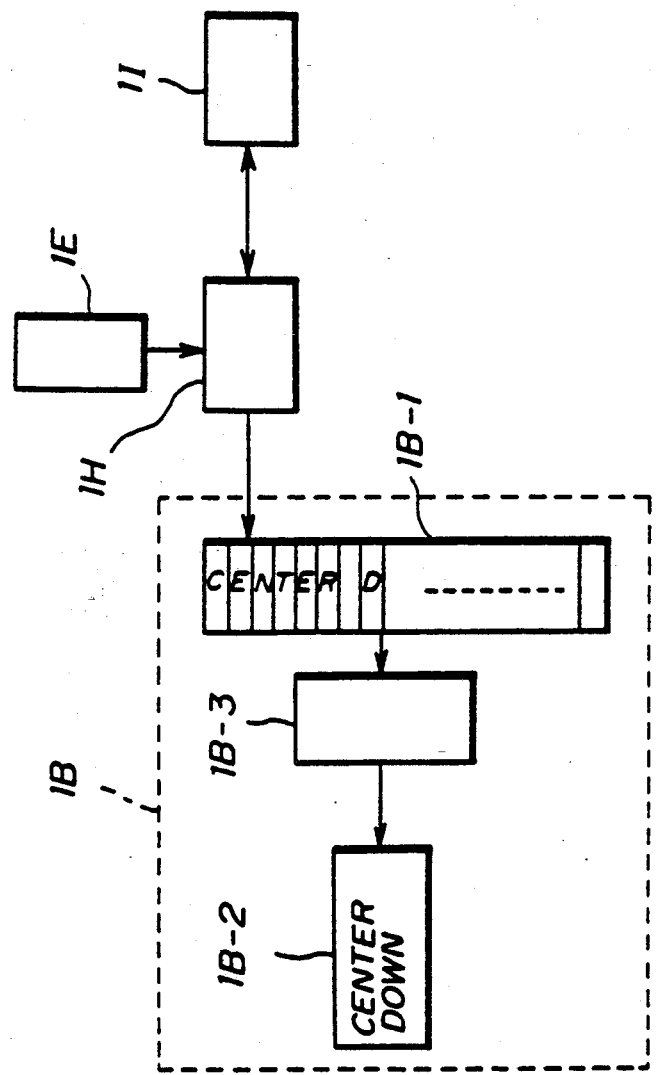
FIG. 4 is a block diagram showing a display which is shown in FIG. 1 in more detail.
Figure 5:
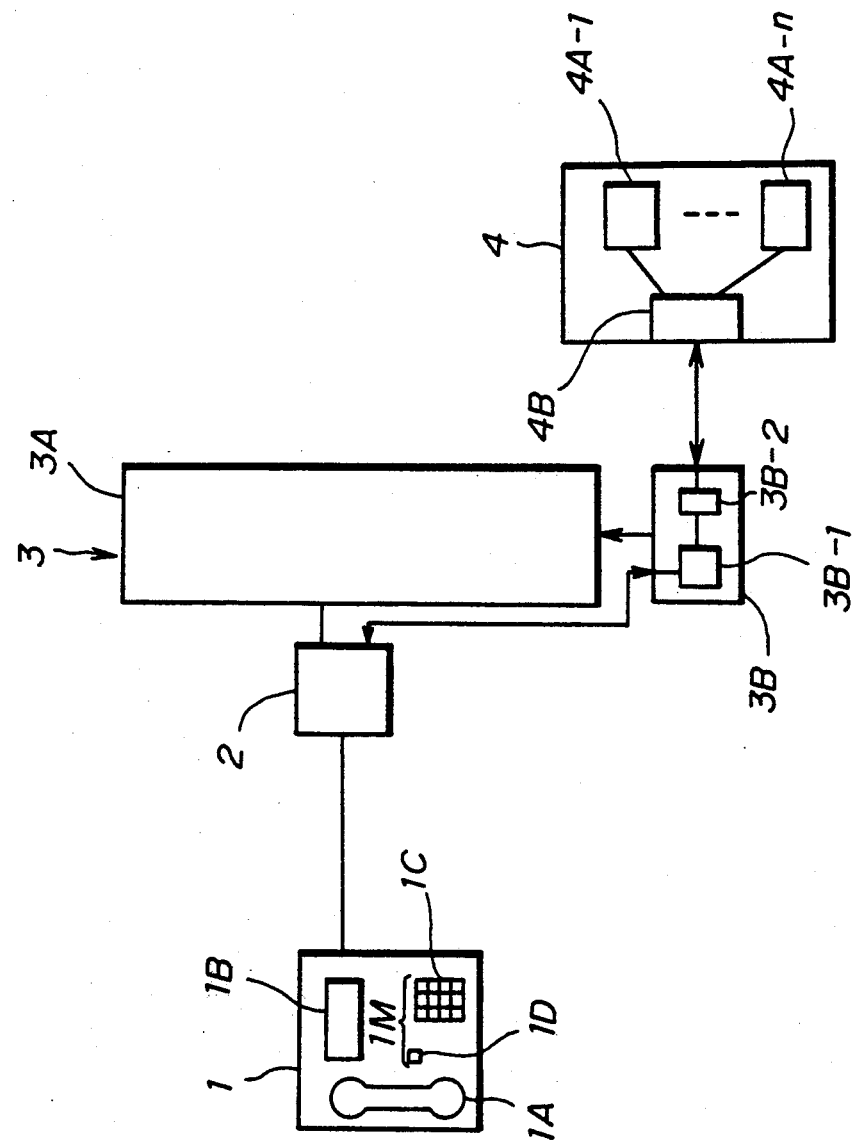
FIG. 5 is a block diagram showing a first embodiment of a switching system for application services according to the present invention.

FIG. 5 shows a first embodiment of a switching system for cation services according to the present invention. In FIG. 5, those parts which are essentially the same as those corresponding parts in FIG. 1 are designated by the same reference numerals.

In FIG. 5, the switching system for application services includes a digital telephone set 1 having a display 1B, a line circuit 2, a switching equipment 3 and an external application processor 4. The external application processor 4 stores programs for providing a plurality of application services. A user makes access to the external application processor 4 from the telephone set 1 via the switching equipment 3 by manipulating keys of the telephone set 1 in a certain manner. Thus, the user can receive an application service which is provided by the external application processor 4.

The telephone set 1 includes a handset 1A having transmitter/receiver functions, a display 1B for displaying various messages, a dial button group (key pad) 1C including a plurality of key buttons which are assigned numbers and predetermined symbols, and an application key button 1D which is used when receiving an application service.

In this embodiment, a plurality (n) application services are provided by the external application processor 4. Accordingly, it is necessary to specify a desired application service from the telephone set 1 out of the plurality of application services, and an application service specifying means 1M is formed by the application key button 1D and the dial key button group 1C for specifying the desired application service out of the plurality of application services.

The line circuit 2 is inserted between the telephone set 1 and the switching equipment 3.

The switching equipment 3 includes a network part 3A as a communication path, and a common control unit 3B which controls switching of the network part 3A and the like. The common control unit 3B includes a means 3B-1 for receiving from the telephone set 1 the information for specifying the desired application service, and a means 3B-2 for transferring the application service specifying information to the external application processor 4.

The external application processor 4 has a plurality of application program parts 4A-1, . . . , 4A-n for the plurality of application services. In addition, the external application processor 4 has a means 4B for selecting the desired application service based on the application service specifying information which is transferred from the switching equipment 3.

In this embodiment, when the user specifies the desired application service by the application service specifying means 1M of the telephone set 1 out of the plurality of application services, this information is transmitted to the common control unit 3B of the switching equipment 3 via the line circuit 2. The common control unit 3B receives the application service specifying information from the telephone set 1 and transfers this application service specifying information to the external application processor 4.

Thereafter, the external application processor selects the desired application service based on the application service specifying information which is transferred from the switching equipment 3.

Figure 6:
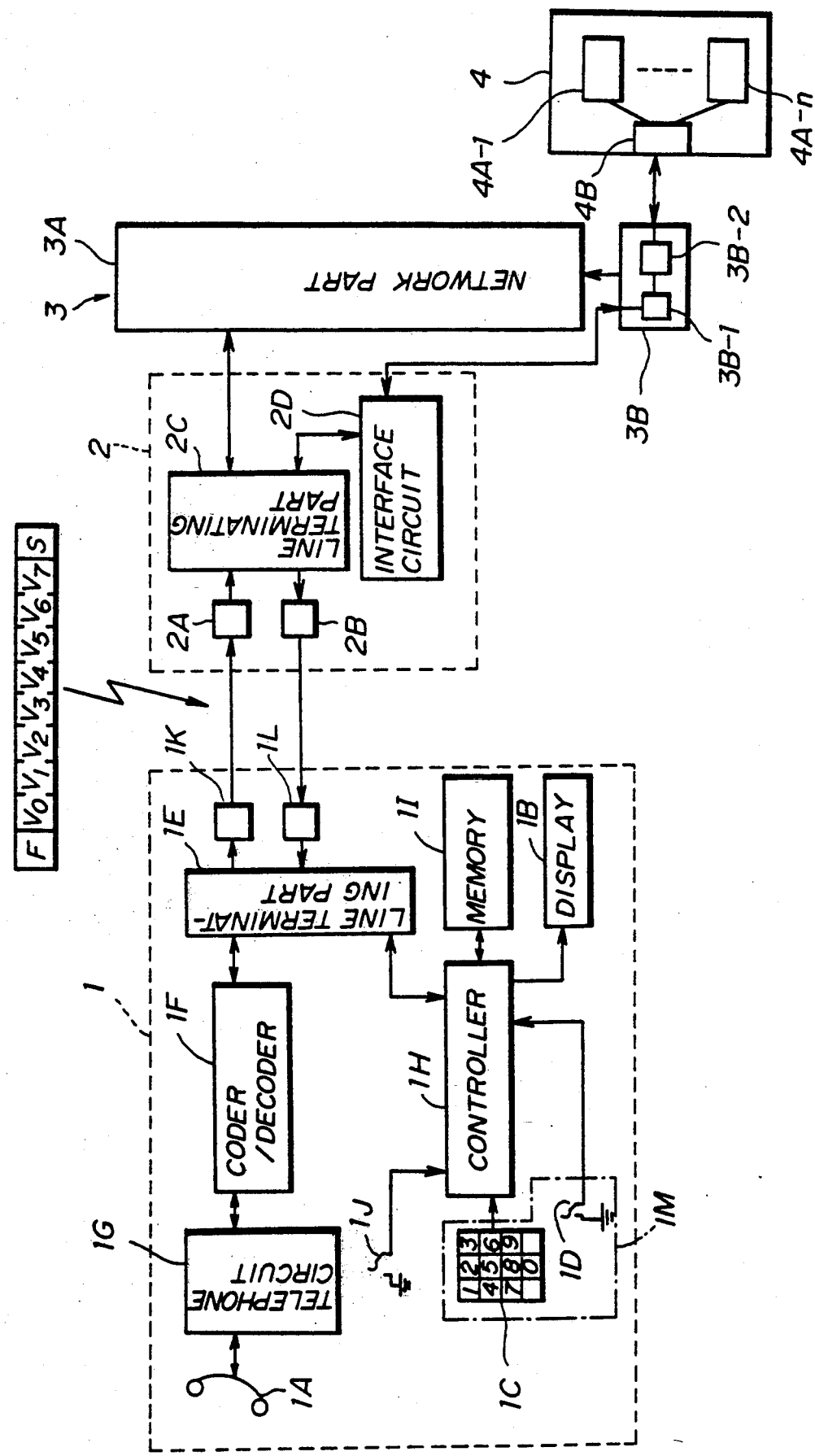
FIG. 6 is a block diagram showing the structure of the first embodiment which is shown in FIG. 5 in more detail.

FIG. 6 shows the embodiment which is shown in FIG. 5 in more detail.

The telephone set 1 includes the handset 1A, the display 1B, the dial key button group 1C, the application key button 1D, a line terminating part 1E, a coder/decoder 1F, a telephone circuit 1G, a controller 1H, a memory 1I, a hook switch 1J, a driver 1K and a receiver 1L. The constituent elements of the telephone set 1 are the same as those of the prior art, and a description thereof will be omitted.

In this embodiment, the external application processor 4 provides the plurality (n) application services. Hence, it is necessary to specify the desired application service from the telephone set 1 out of the plurality of application services, and the application key button 1D and the dial key button group 1C are used for this purpose. Accordingly, the application service specifying means 1M is formed by the application key button 1D and the dial key button group 1C for specifying the desired application service out of the plurality of application services.

The telephone set 1 is coupled to the switching equipment 3 via the line circuit 2. In other words, a driver 1K and a receiver 1L which are provided as transmitter/receiver part of the telephone set 1 are coupled to a corresponding receiver 2A and a corresponding driver 2B of the line circuit 2. The receiver 2A and the driver 2B are terminated at a line terminating part 2C. The audio signals and the control signals are separated and integrated in the line terminating part 2C, and the audio signals are transmitted to the network part 3A of the switching equipment 3, while the control signals are transmitted to the common control unit 3B of the switching equipment 3 via an interface circuit 2D.

Frames which are transmitted between the digital telephone set 1 and the line circuit 2 have a structure identical to that of the prior art, and the control information such as the application service information is inserted in the control bit S.

Similarly as in the prior art, the switching equipment 3 includes the network part 3A as a communication path, and the common control unit 3B which controls switching of the network part 3A and the like. The common control unit 3B includes the means 3B-1 for receiving from the telephone set 1 the information for specifying the desired application service, and the means 3B-2 for transferring the application service specifying information to the external application processor 4.

The external application processor 4 is coupled to the common control unit 3B of the switching equipment 3. The external application processor 4 has the plurality of application program parts 4A-1, . . . , 4A-n for the plurality of application services, and the protocol control part 4B for selecting the desired application service based on the application service specifying information which is transferred from the common control unit 3B of the switching equipment 3.

For example, as application services provided by the plurality of application program parts 4A-1, . . . , 4A-n, there are the message display service, the air conditioning control service, the illumination control service and the like.

Figure 7:
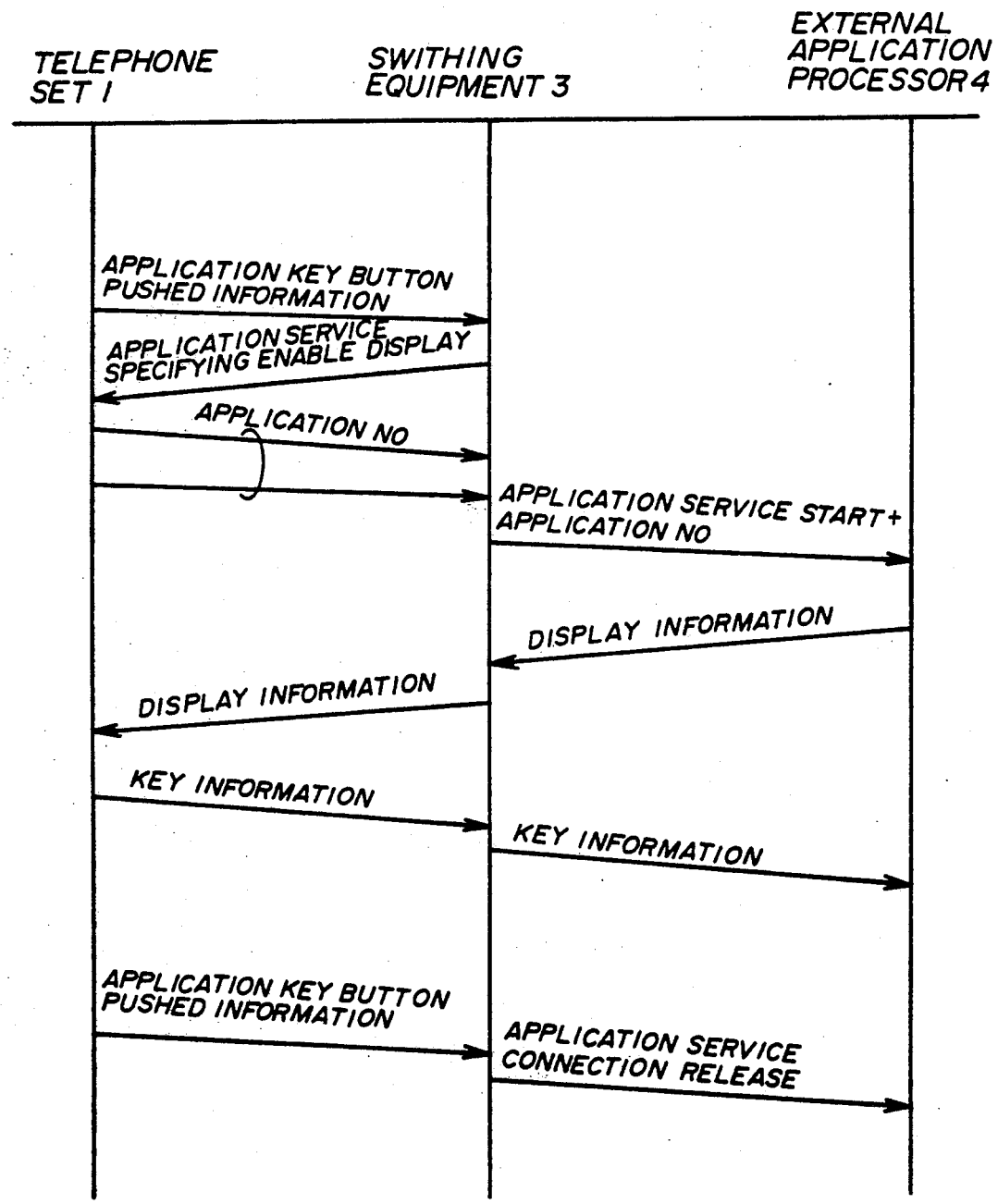
FIG. 7 is a time chart for explaining an operation of the first embodiment.

Next, a description will be given of the procedure for providing the application service, by referring to FIG. 7. First, the user pushes the application key button 1D of the telephone set 1 so as to transmit the application key button pushed information from this telephone set 1 to the common control unit 3B of the switching equipment 3. When the common control unit 3B of the switching equipment 3 receives the application key button pushed information, the application service specifying enable display information is transmitted to the telephone set 1 to display a message on the display 1B of the telephone set 1 to indicate that the application service can be specified.

Thereafter, the user manipulates the dial key button group 1C of the telephone set 1 to specify the desired application service number after confirming the above display.

When the desired application service is specified out of the plurality of application services, the common control unit 3B of the switching equipment 3 responsive thereto transmits the application service start and the specified application service number to the external application processor 4. Hence, the external application processor 4 returns the display information such as the specific procedure and comments to the telephone set 1 via the common control unit 3B of the switching equipment 3. As a result, the display information is displayed on the display 1B of the telephone set 1.

Thereafter, the user pushes the dial key button depending on the display information. Then, this key information is transmitted to the external application processor 4 via the common control unit 3B of the switching equipment 3. Accordingly, it is possible to receive the application service which is provided by the external application processor 4 and is specified from the telephone set 1.

The user thereafter pushes the application key button 1D to transmit this information from the telephone set 1 to the common control unit 3B of the switching equipment 3, and further, the common control unit 3B of the switching equipment 3 gives the application service connection release instruction based on this information.

Therefore, according to this embodiment, a plurality of application services are provided by the external application processor 4, and a plurality of applications to be started can be specified from the telephone set 1, thereby greatly improving the added value of the switching system for application services.

Figure 8:
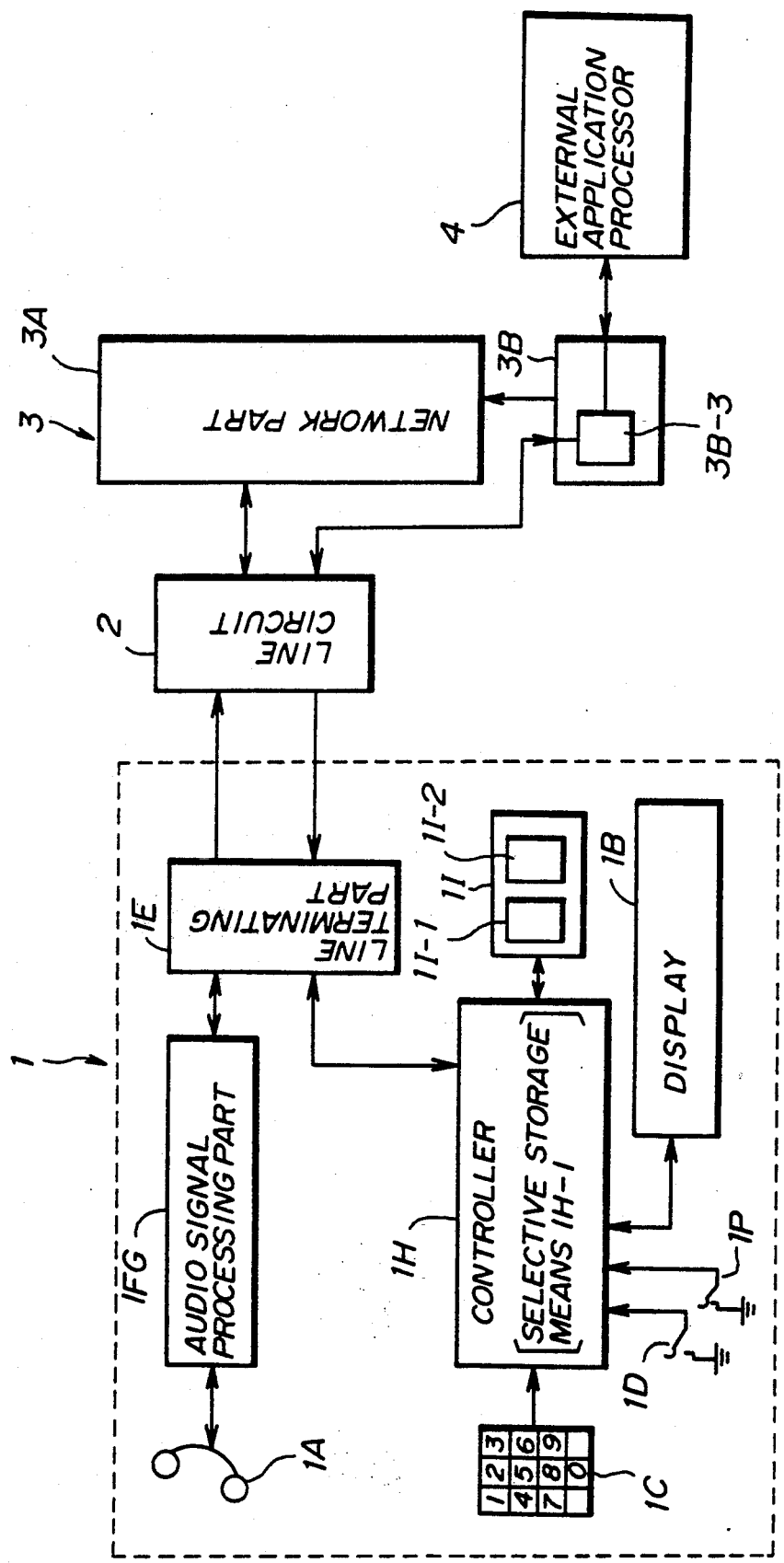
FIG. 8 is a block diagram showing a second embodiment of the switching system for application services according to the present invention.

Next, a description will be given of a second embodiment of the switching system for application services according to the present invention by referring to FIG. 8. In FIG. 8, those parts which are essentially the same as those corresponding parts in FIGS. 5 and 6 are designated by the same reference numerals, and a description thereof will be omitted.

In FIG. 8, the telephone set 1 includes the handset 1A, the display 1B, the dial key button group 1C, the application key button 1D, the line terminating part 1E, an audio signal processing part 1FG, the controller 1H, the memory 1I and a display switching means 1P.

The audio signal processing part 1FG has coder/decoder and telephone circuit functions. In addition, the display 1B, the dial key button group 1C, the application key button 1D, the memory 1I and the display switching means 1P are coupled to the controller 1H. The controller 1H transmits signals to and receives signals from the display 1B, the dial key button group 1C, the application key button 1D, the memory 1I and the display switching means 1P.

The memory 1I includes a first memory area 1I-1 for storing the display information for application service, and a second memory area 1I-2 for storing the display information for call control.

The display switching means 1P is provided to switch the display between the display for application service and the display for call control.

The controller 1H has the function of a selective storage means 1H-1 for storing the display information for application service into the first memory area 1I-1 and the display information for call control into the second memory area 1I-2 based on the display identification information which is received from the switching equipment 3.

The switching equipment 3 includes the network part 3A and the common control unit 3B, and the external application processor 4 which stores the programs for predetermined application services is coupled to the common control unit 3B. Furthermore, the common control unit 3B of the switching equipment 3 includes a display identification information adding means 3B-3 for adding the display identification information which is used for identifying whether the display information transmitted to the telephone set 1 is the display information for application service or the display information for call control.

According to this embodiment, the user manipulates the keys of the telephone set 1 in a certain manner depending on the display on the display 1B of the telephone set 1 when receiving the application service. Hence, the user makes access to the external application processor 4 from the telephone set 1 via the switching equipment 3. However, when a call is received from another line, the selective storage means 1H-1 of the controller 1H of the telephone set 1 receives the display identification information from the display identification information adding means 3B-3 of the switching equipment 3, and the display information for call control such as the number of the caller is stored in the second memory area 1I-2. In addition, the display information for call control is displayed on the display 1B in place of the display information for application service. In this state, the display information for application service is stored in the first memory area 1I-1.

Thereafter, in order to display the display content for application service again, the user switches the display switching means 1P. Hence, the display is switched from the display for call control to the display for application service.

Figure 9:
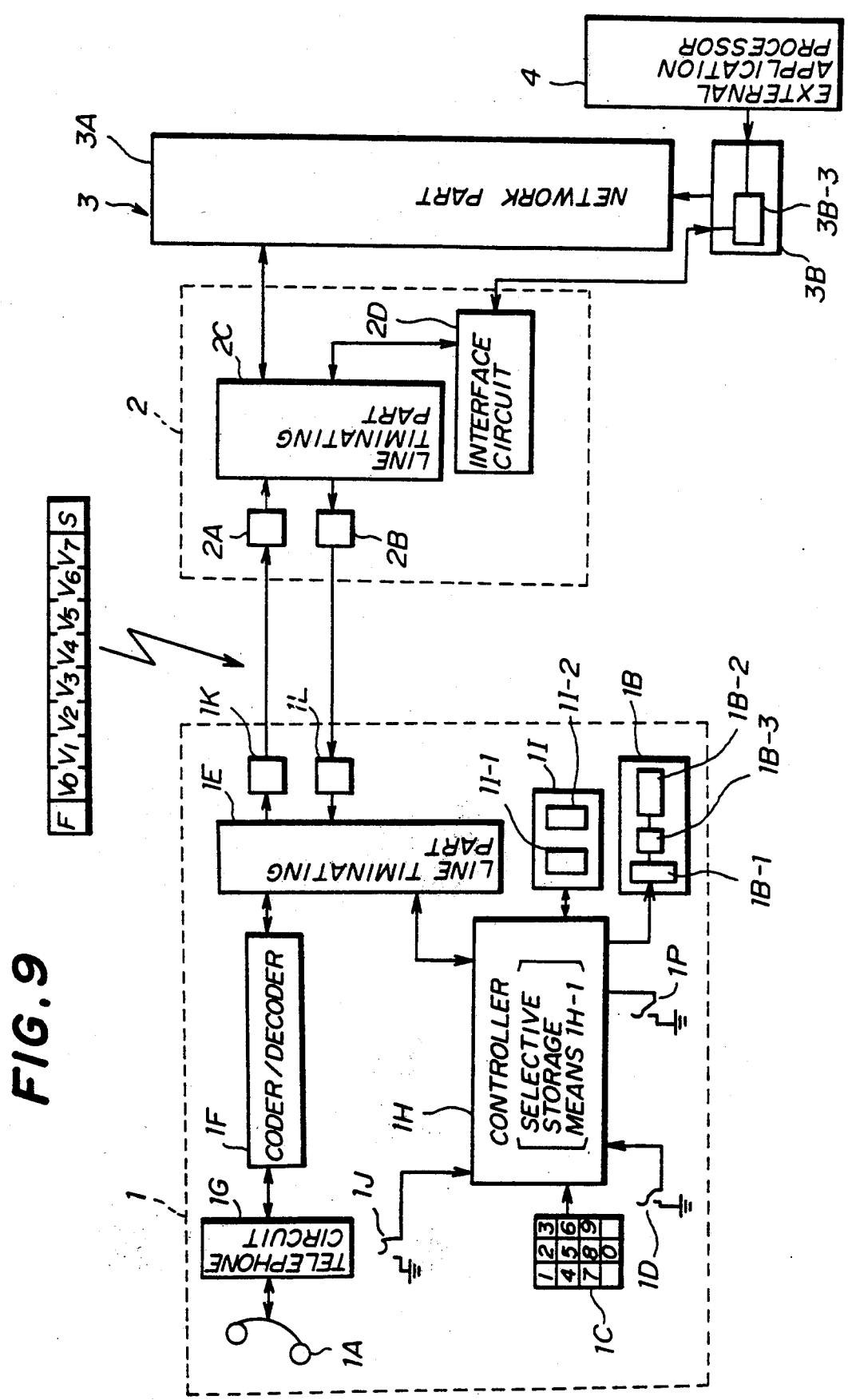
FIG. 9 is a block diagram showing the structure of the second embodiment which is shown in FIG. 8 in more detail.

FIG. 9 shows the embodiment which is shown in FIG. 8 in more detail. In FIG. 9, those parts which are essentially the same as those corresponding parts in FIG. 6 are designated by the same reference numerals, and a description thereof will be omitted.

The display 1B includes the display memory 1B-1. The display panel 1B-2 and the display controller 1B-3.

The common control unit 3B of the switching equipment 3 has the function of the display identification information adding means 3B-3 for adding the display identification information which is used for identifying whether the display information transmitted to the telephone set 1 is the display information for application service or the display information for call control. This display identification information is transmitted in a control channel.

In order for the user to receive the application service, the application key button 1D of the telephone set 1 is first pushed so as to transmit the application key button pushed information from the telephone set 1 to the common control unit 3B of the switching equipment 3. When the common control unit 3B of the switching equipment 3 receives the application key pushed information, the application service start is transmitted to the external application processor 4. Thus, the display information from the external application processor 4 such as the predetermined procedures and comments and the display identification information which indicates that the display information is for the application service are returned to the telephone set 1 via the common control unit 3B. Hence, the display information for application service is displayed on the display 1B of the telephone set 1. In other words, the selective storage means 1H-1 of the controller 1H of the telephone set 1 receives the display identification information from the display identification information adding means 3B-3 of the switching equipment 3, and the display information for application service is stored in the first memory area 1I-1 and the display information for application service is displayed on the display 1B.

Thereafter, the user pushes the dial key button depending on the display information. Then, this key information is transmitted to the external application processor 4 via the common control unit 3B of the switching equipment 3. Accordingly, the user can receives the application service which is provided by the external application processor 4.

Figure 10B:
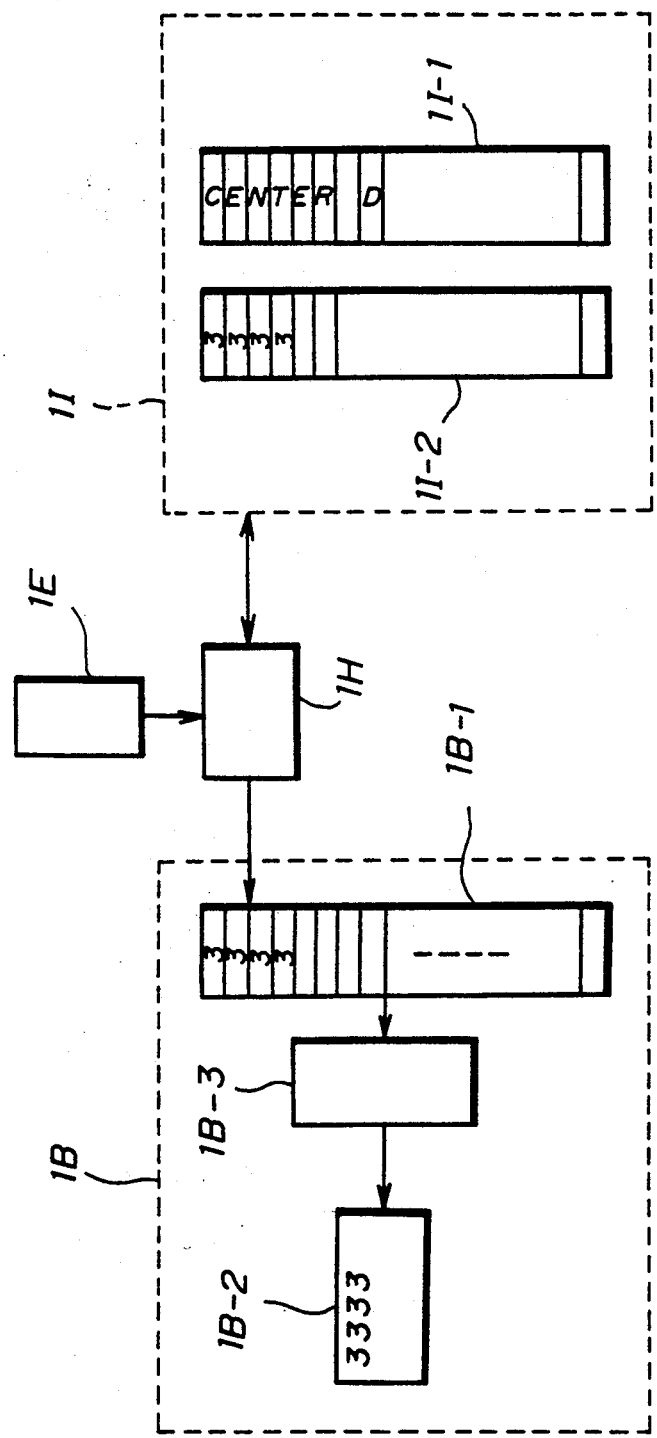

The display information is stored in the first memory area 1I-1 in a similar manner also when an abnormality such as a malfunction of the control center occurs during the application service. In addition, a display "CENTER DOWN" shown in FIG. 10A, for example, is displayed on the display panel 1B-2 of the display 1B.

When a call is received from another line, the selective storage means 1H-1 of the controller 1H of the telephone set 1 receives the display identification information which indicates that the display information is the display information for call control from the display identification information adding means 3B-3 of the switching equipment 3. Hence, the display information for call control such as the number of the caller is stored in the second memory area 1I-2, and the display information "3333" for call control shown in FIG. 10B, for example, is displayed on the display panel 1B-2 of the display 1B in place of the display for the application service. In this state, the display information for application service is stored in the first memory area 1I-1 and is not erased.

Figure 10C:
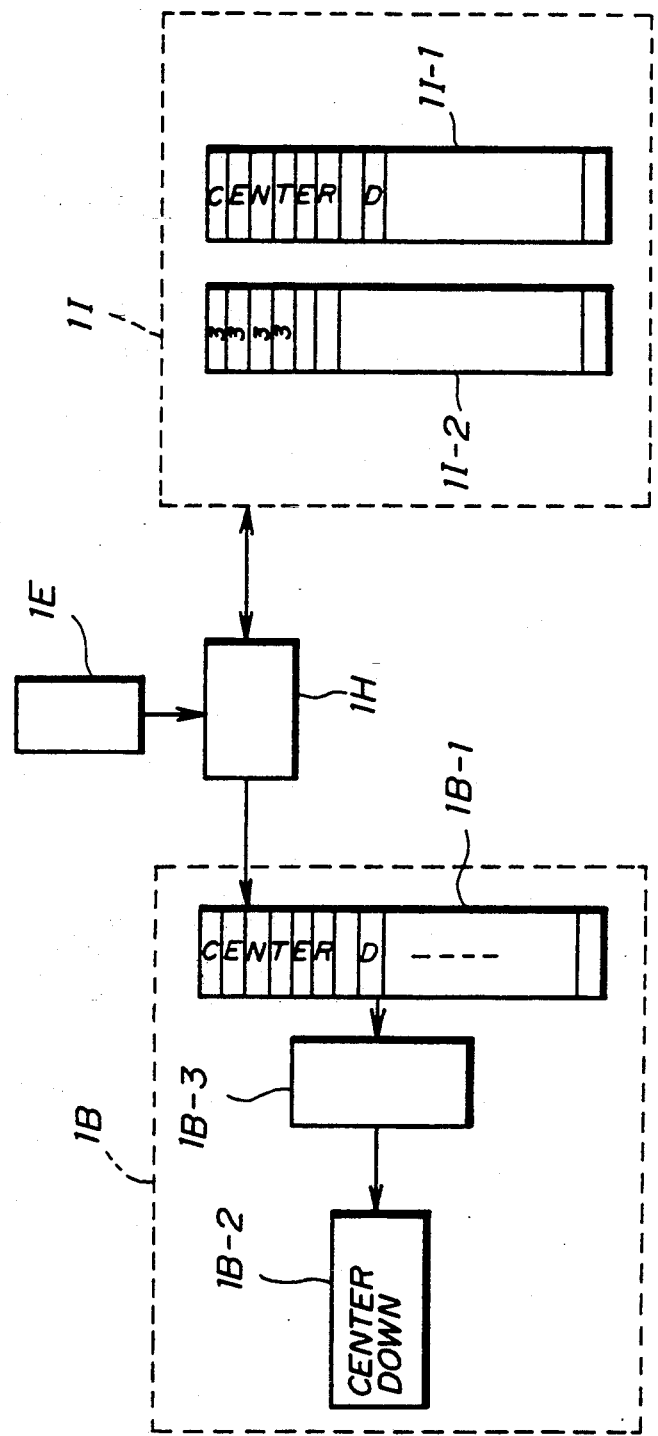

Thereafter, in order to again display the display content for the application service again on the display 1B, the user switches the display switching means 1P. Hence, the display is switched from the display for call control to "CENTER DOWN" shown in FIG. 10C, for example.

Therefore, in this embodiment, the display can be selectively made (including display for the second time) even when a call is received from another line during the display of the message for the application service and two kinds of displays must be made on the display. For this reason, it is possible to greatly improve the added value of the switching system for application services.

In the embodiments described heretofore, a single external application processor which stores programs for application services is coupled to the switching equipment. However, when providing a plurality of application services, it is conceivable to couple a plurality of application processors to the switching equipment. When realizing the application services from the plurality of application processors, the output requests from the plurality of application processors with respect to one terminal (telephone set) may cause collisions. In this case, it is necessary to exclusively control the output requests. In addition, the data input from one terminal must be notified to only a specific application processor.

However, in the conventional switching system for application services, the switching equipment which releases the terminal input/output interface only considers connection with a single application processor. For this reason, no measure is taken to exclusively control the output requests which are made from a plurality of application processors with respect to the same terminal, and no measure is taken to notify the input data from the terminal to a specific application processor. Accordingly, there is a problem in that when output requests to the same terminal are simultaneously generated from a plurality of application processors, this causes abnormal operation of the switching system. In addition, the input data from a single terminal will be notified to all application processors, and there is also a problem in that unnecessary notification of the input data is made to the application processors other than the specific application processors.

Next, a description will be given of a third embodiment of the switching system for application services in which the above described problems can be overcome. FIG. 11 shows the third embodiment. In FIG. 11, the switching system for application services includes a terminal group 11 made up of a plurality of terminals $11_1$ through $11_m$, a switching equipment 12, and an application processor group 15 made up of a plurality of application processors $15_1$ through $15_n$. The switching equipment 12 includes line circuits 12-$1_1$ through 12-$1_m$, a telephone path switch 12-2, a communication control processor 13, and an interface processor 14. The interface processor 14 forms an essential part of this embodiment, and includes a terminal management table 14-1.

The communication control processor 13 controls connections of the terminals $11_1$ through $11_m$.

The interface processor 14 registers an exclusive flag, a device user, a device and a terminal which are notified from the application processor of the application processor group 15 in the terminal management table 14-1. The interface processor 14 also notifies the terminal and device to the communication control processor 13 to be stored therein. In addition, the interface processor 14 retrieves the terminal management table 14-1 for the device which is notified from the communication control processor 11 and exclusively notifies only the application processor of the device user which is registered in the terminal management table 14-1. Furthermore, the interface processor 14 outputs the output request notified from the application processor of the device user to the device of the corresponding terminal.

The terminal management table 14-1 is a table which registers the device user, the exclusive flag and the like in correspondence with the terminals and the devices.

The application processors $15_1$ through $15_n$ are computers for providing various application services by making input and output between the devices of the terminals.

First, a brief description will be given of the operation of this embodiment. As shown in FIG. 11, the interface processor 14 is arranged between the communication control processor 13 which controls the connections of the terminals $11_1$ through $11_m$ and the plurality of application processors $15_1$ through $15_n$. The terminal management table 14-1 is provided within the interface processor 14. The interface processor 14 registers the terminal, device, device user and exclusive flag notified from the application processor in the terminal management table 14-1, and notifies at least the device to the communication control processor 13 to be stored therein. The interface processor 14 which receives the notification from the communication control processor 13 which detects the device input from the terminal retrieves the terminal management table 14-1 and exclusively notifies only the application processor of the registered device user. The interface processor 14 which receives the notification of the device output request from the application processor retrieves the terminal management table 14-1 and exclusively outputs to the device of the corresponding terminal when it is detected that the device output request is from the registered device user.

Accordingly, the application processor registers the terminal, device, device user and exclusive flag in the terminal management table 14-1, the device input information is exclusively notified only to the application processor of the registered device user in correspondence with the device input from the terminal, and the output request is exclusively output to the device of the corresponding terminal in correspondence with the output request from the application processor only in the case of the application processor of the registered device user. Hence, it is possible to improve the processing capability of the switching system for application services in which the switching equipment 13 and the plurality of application processors $15_1$ through $15_n$ are connected.

Next, a more detailed description will be given of the construction and operation of this embodiment by referring to FIGS. 11 through 13.

In FIG. 11, the terminals $11_1$ through $11_m$ are terminals which are subject to the application services. For example, a telephone number "1234" is assigned to the terminal $11_1$.

The switching equipment 12 connects to the terminals $11_1$ through $11_m$ and carries out a switching process and the like. The switching equipment 12 includes line circuits $12\text{-}1_1$ through $12\text{-}1_m$ which are connected to the terminals $11_1$ through $11_m$, the telephone path switch 12-2 for mutually connecting the line circuits $12\text{-}1_1$ through $12\text{-}1_m$, and the communication control processor 13 which supervises and controls the states of the terminals $11_1$ through $11_m$ which are connected to the line circuits $12\text{-}1_1$ through $12\text{-}1_m$, where the states include connected, held and disconnected states.

The interface processor 14 is arranged between the communication control processor 13 and the plurality of application processors $15_1$ through $15_n$. As shown in FIG. 13, the interface processor 14 retrieves the terminal management table 14-1 in correspondence with the notification from the communication control processor 13 and notifies the device input information (terminal, device) only to the application processor of the device user which is registered in the terminal management table 14-1. The notification between the interface processor 14 and the application processors $15_1$ through $15_n$ is carried out by messages having a format which can be understood by the application processors $15_1$ through $15_n$ and the mutual notification is made via the line (for example, a leased line). The terminal management table 14-1 which is provided within the interface processor 14 is a table which registers the device users and exclusive flags in correspondence with the terminal and device. When the exclusive flag is ON, another application processor already has the right of use and a right of use cannot be obtained. Hence, only the application processor of the device user having the exclusive flag which is ON can exclusively receive the device input information from the device of the registered terminal and output the device output request to the device of the corresponding terminal.

The application processor group 15 is made up of the plurality of application processors $15_1$ through $15_n$, and provides various application services by carrying out information input and output between the device of the terminal. The various application services are carried out by the plurality of application programs within the application processors $15_1$ through $15_n$.

Figure 12:
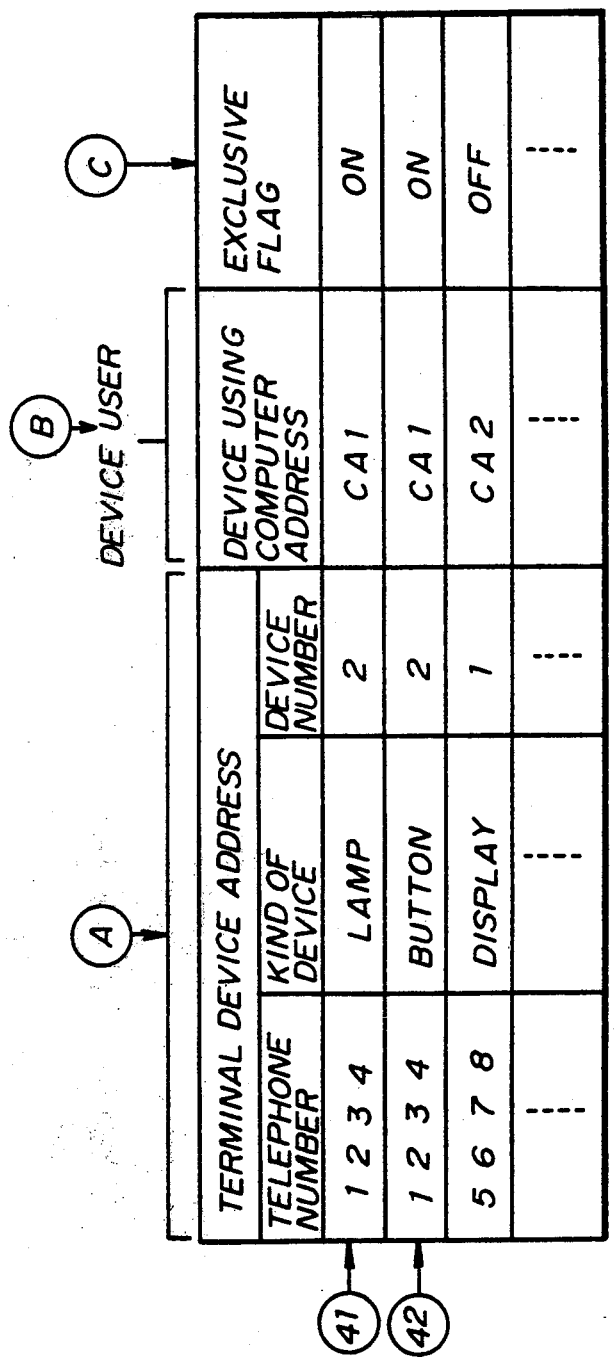
FIG. 12 is a showing an embodiment of a terminal management table shown in FIG. 11.

FIG. 12 shows an embodiment of terminal management table 14-1. In FIG. 12, the terminal management table 14-1 registers as a terminal device address (A) the kind of device such as the lamp, button and display of the terminal and the device number in the case where the devices of the same kind exist. The device user computer address is registered as a device user (B). An exclusive flag (C) is a flag which indicates that the right of use is exclusively obtained for the concerned entries, and the other processors are prohibited from making information input and output between the device of the registered terminal when the exclusive flag (C) is ON. In the case shown, for example, the exclusive flag is registered as being ON for the entries which are the telephone number "1234", the kind of device "lamp", the device number "2" and the device user "CAI". Hence, the application processors other than the application processor having the computer address CAI cannot make a registration with respect to this terminal, and the exclusive control is carried out as a result such that the input and output is prohibited between these other application processors and this terminal.

Next, a detailed description will be given of the operation of FIG. 11 by using FIG. 13. Here, appln(1) and Iappln(2) are application programs of different application processors $15_1$ and $15_2$, and provide various application services. TCSI is an abbreviation for telecommunication and computer service interface, and corresponds to the interface processor 14 shown in FIG. 11. PBX corresponds to the switching equipment 12.

Figure 13:
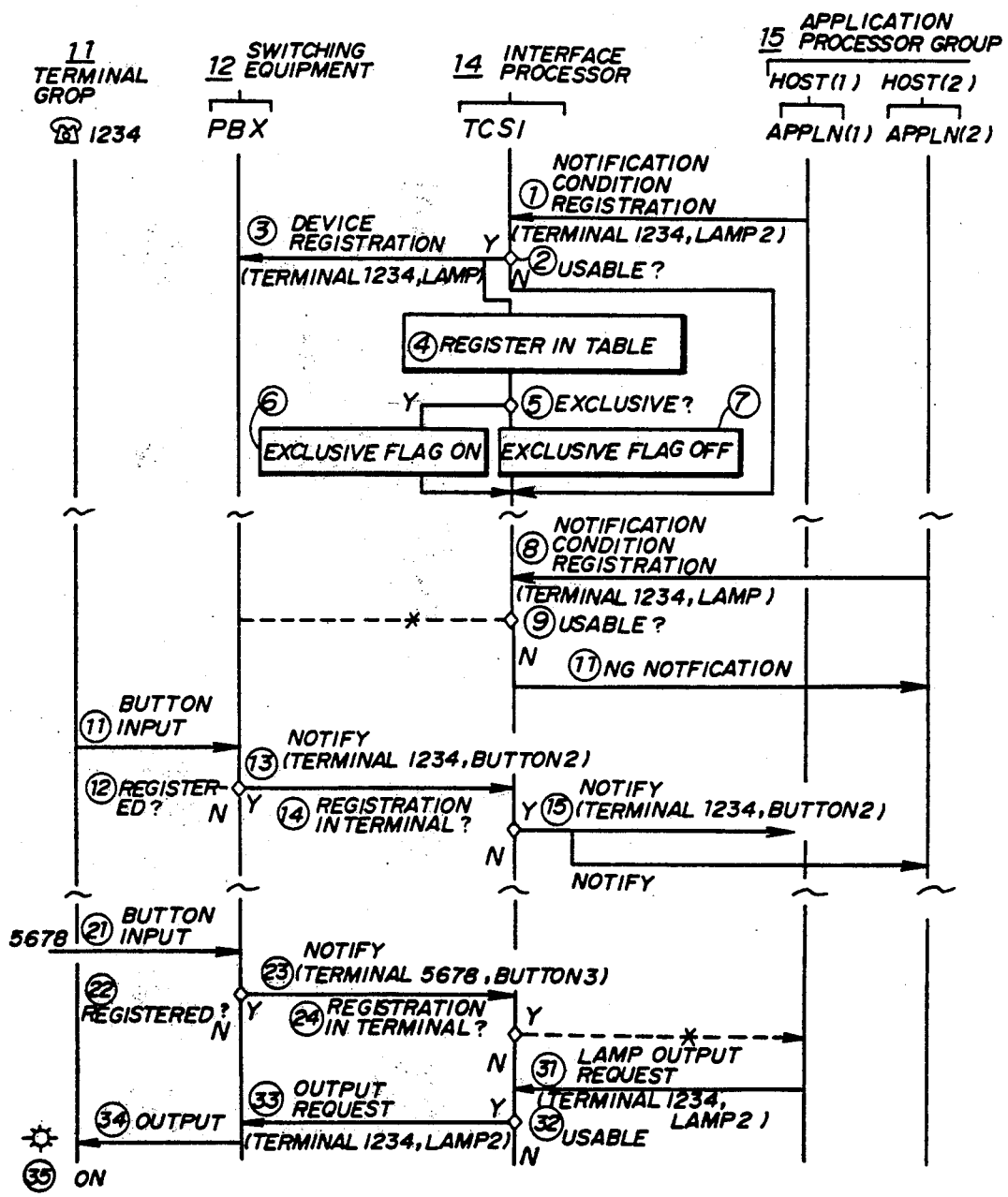
FIG. 13 is a chart for explaining an operation of the third embodiment.

In FIG. 13, a step ① notifies the notification condition registration. For example, in the step ①, the appln(1) notifies the notification condition registration to the interface processor 14 taking the terminal "1234" and the lamp "2" as the parameters.

A step ② judges whether or not the device of the desired terminal is usable. For example, the step ② retrieves the terminal management table 14-1 and judges whether or not the exclusive flag of the entries which are the terminal "1234" and the lamp "2" by the notification in the step ① is OFF (or not registered). When the exclusive flag is OFF and the lamp "2" of the terminal "1234" is unused and usable, the judgement result in the step ② is YES and the operation advances to a step ③. When the judgement result in the step ② is NO, the lamp "2" of the terminal "1234" is not usable and no registration can be made to the PBX and the terminal management table 14-1, and an answer is made to the application processor $15_1$ to notify this non-registrable state.

The step ③ registers the device in the PBX. For example, "1234" and "2" (or only the lamp "2") which are judged as being usable in the step ② are notified to the PBX and registered.

A step ④ makes a registration in the terminal management table 14-1 in parallel to the execution of the step ③. In this case, the registration of the exclusive flag is excluded. The registration to the terminal management table 14-1 is made for example as indicated by an entry ㊶ in FIG. 12.

A step ⑤ judges whether or not the notification condition is exclusive. For example, the step ⑤ judges whether or not the exclusive notification condition is notified from the appln(1) in the step ①. When the judgement result in the step ⑤ is YES, a step ⑥ registers the exclusive flag of the entry ㊶ as being ON in the terminal management table 14-1, and the registration is made so that the appln(1) can exclusively make input and output between the lamp "2" of the terminal "1234". When the judgement result in the step ⑤ is NO, a step ⑦ makes the exclusive flag of ㊶ OFF and sets the notification condition to common.

By the above described procedure, the terminal, device, device user and exclusive flag are registered in the terminal management table 14-1 within the interface processor 14.

In a step ⑧, the appln(2) for example notifies the notification condition registration to the interface processor 14 taking the terminal "1234" and the lamp "2" as the parameters.

A step ⑨ judges whether or not the desired terminal device is usable. In this case, the registration is already made in the step ⑥ for the same terminal and device and the exclusive flag is registered as being ON. Hence, the judgement result in the step ⑨ is NO and a step ⑩ makes an unusable notification NG with respect to the appln(2).

Therefore, when the exclusive flag of the terminal management table 14-1 is registered as being ON, other application programs cannot use the same terminal device. Hence, it is possible to make an exclusive control of the input and output between the application processors $15_1$ through $15_n$ and the terminals $11_1$ through $11_m$.

Next, a description will be given of a case where steps ⑪ through ⑮ are used to notify the input information from the terminals $11_1$ through $11_m$ to the appln(1) and a case where steps ㉑ through ㉔ are used not to notify the input information from the terminals $11_1$ through $11_m$ to the appln(1), by referring to the terminal management table 14-1 shown in FIG. 12.

First, a description will be given of the steps ⑪ through ⑮.

In the step ⑪, the user makes a button input by pushing the button "2" which is the device of the terminal "1234".

A step ⑫ judges whether or not the same content as the button input is registered within the communication control processor 13. For example, the step ⑫ judges whether or not the button "2" of the terminal "1234" input in the step ⑪ is registered within the communication control processor 13 (or whether or not only the button "2" is registered). In this case, the judgement result in the step ⑫ is YES, and a step ⑬ notifies the terminal "1234" and the button "2" to the interface processor 14. On the other hand, nothing is done when the judgement result in the step ⑫ is NO.

A step ⑭ judges whether or not the registration to the terminal exists in the terminal management table 14-1 in correspondence with the notification of the step 13. For example, the step 14 judges whether or not the button "2" of the terminal "1234" notified in the step 13 is registered in the terminal management table 14-1. In this case, an entry 42 registered in the terminal management table 14-1 as shown in FIG. 12, and the judgement result in the step 14 is YES. Hence, a step 15 notifies the button "2" of the terminal "1234" to appln(1) which is the device user (address CA2). Accordingly, in correspondence with the pushing of the button "2" of the terminal "1234", it is possible to exclusively notify the terminal input information only to the appln(1) which is the device user preregistered in the terminal management table 14-1.

Next, a description will be given of the steps 21 through 24.

In the step 21, the user makes a button input by pushing the button "2" which is the device of a terminal "5678".

The step 22 judges whether or not the same content as the button input is registered within the communication control processor 13. For example, the the step 22 judges whether or not the button "2" of the terminal "5678" input in the step 21 (or button "2") is registered within the communication control processor 13. In this case, the=judgement result in the step 22 is YES, and a step 23 notifies the terminal "5678" and the button "2" to the interface processor 14. On the other hand, nothing is done when the judgement result in the step 22 is NO.

A step 24 judges whether or not the registration related to the terminal exists in the terminal management table 14-1 in correspondence with the notification of the step 23. For example, the step 24 judges whether or not the button "3" of the terminal "5678" notified in the step 23 is registered in the terminal management table 14-1. In this case, no corresponding entry is registered in the terminal management table 14-1 shown in FIG. 12, and the judgement result in the step 24 is NO and nothing is done.

Next, a description will be given of the procedure in which the appln(1) turns ON the lamp "2" of the terminal "1234" using steps 31 through 34.

In the step 31, the appln(1) notifies the lamp output request with respect to the lamp "2" of the terminal "1234" to the interface processor 14.

A step 32 judges whether or not the device of the terminal which is the subject of the output request is usable. For example, the step 32 retrieves the terminal management table 14-1 shown in FIG. 12 and judges whether or not the output request for the lamp "2" of the terminal "1234" notified in the step 31 is registered. In this case, the entry 41 is registered as shown in FIG. 12, and the judgement result the step 32 is YES. Hence, a step 33 notifies the output request for the lamp "2" of the terminal "1234" to the communication control processor 13.

In a step 34, the communication control processor 13 calls the terminal $11_1$ and turns ON the lamp "2".

Therefore, when the entry corresponding to the device output request from the application processor is registered in the terminal management table 14-1, it is possible to make an exclusive output with respect to the device of the terminal registered in the terminal management table 14-1 by a certain application processor, by making an output with respect to the device of the corresponding terminal.

In addition, when the application processor $15_1$ finishes using the device of the terminal, the application processor $15_1$ makes the right of use cancel notification to the interface processor 14 and registers an OFF exclusive flag in the corresponding entry of the terminal management table 14-1. Thereafter, the other application processors $15_2$ through $15_n$ can turn ON the exclusive flag with respect to the device of this terminal and obtain the right of use.

As described above, according to this embodiment, it is possible to exclusively control the input and output between the device of the terminal and a certain application processor. Hence, it is possible to improve the processing capability of the switching system for application services in which the switching equipment and the plurality of application processors are connected.

In FIG. 11, the interface processor 14 is illustrated as being a part of the switching equipment 13. However, the interface processor 14 may of course take the form of an adapter which is externally coupled to the switching equipment 12.

Next, a description will be given of a particular example of the application service, the outline of the service and the service control procedure.

As one example of the application service, there is a service related to the inquiries on the delivery status of parcels delivered by courier service. This parcel courier delivery status inquiry service is provided by the courier company in response to inquiries from customers on the delivery status of parcels, and the delivery status of parcels managed in the application processor (host computer) is retrieved using the telephone set display and dial key pad. The service control procedure for this case will be described. First, when the operator receives a telephone inquiry from a customer in the courier company, the operator inputs a service code from a service key of the telephone set or specifies the service by a function key in the connected state. By this operation, the parcel courier delivery status inquiry service of the application processor is started. The started service program displays on the display of the telephone set a message which requests the input of a customer inquiry number. The operator asks the customer the inquiry number over the telephone in response to the message which is displayed on the display, and inputs the inquiry number from the dial key pad. Based on the input inquiry number, the application processor retrieves the delivery status of the parcel and displays a result of the retrieval on the display of the telephone set. The operator over the telephone informs the customer of the delivery status of the parcel which is displayed on the display.

Next, a description will be given of a conference room reservation service. The conference room reservation service is a service in which an access is made to a conference room reservation management database of a company managed by an application processor (computer), so as to make a reservation inquiry and/or reservation registration.

The service control procedure for this service will be described. First, the user inputs a service code from a service key or a function key so as to specify the service. Hence, the conference room reservation service of the application processor is started. The started service program displays on the display of the telephone a message which requests input of the date of reservation. Responsive to the message displayed on the display, the user inputs the date from a dial key pad. The application processor makes access to the conference room reservation management database based on the input date, and displays on the display a message which requests user's confirmation when an available conference room exists. When the user confirms by an input from a key in response to the message displayed on the display, the application processor registers the reservation date for the confirmed conference room.

Next, a description will be given of a company attendance book management service. The attendance book management service is a service in which an access is made from the telephone set to an application processor (computer) to register manage attendance to and leaving from the company.

A description will be given of the service control procedure for this service. First, the user (employee) inputs a service code from a service key or a function key of the telephone set so as to specify the service. Hence, the attendance book management service of the application processor is started. The started application program displays on the display of the telephone set a message which requests an input of an employee number and a password. The user inputs the employee number and the password from a dial key pad in response to the message which is displayed on the display. The application processor checks the input employee number and password and registers the attending or leaving time when the password is correct, and displays on the display a message informing that the registration is completed.

Next, a description will be given of a lunch reservation service. The lunch reservation service is a service in which an access is made from the telephone set to an application processor which manages lunch orders so as to make a lunch order.

A description will be given of the service control procedure for this service. First, the user inputs a service code from a service key or a function key of the telephone so as to specify the service. As a result, the lunch reservation service of the application processor is started. The started application program displays on the display of the telephone a message which requests input of a department code and a password. The user inputs the department code and the password from a dial key pad in response to the message which is displayed on the display. The application processor checks the input department code and password and displays a lunch menu on the display when the password is correct. In addition, the application processor displays on the display a message which requests input of the kind of lunch and the number of lunches. The user inputs the kind and number of lunches from the dial key pad in response to the menu and message which are displayed on the display. The application processor displays on the display a message which requests confirmation of the user's input. When the user confirms the user's input from a key in response to the message displayed on the display, the application processor registers the confirmed kind and number of lunches, and displays on the display a message which indicates that the registration is completed.

Next, a description will be given of an air conditioning/illumination/temperature and humidity control service. The air conditioning/illumination/temperature and humidity control service is a service in which a connection is made to an application processor which forms an existing building management system so as to enable control of the air conditioning/illumination/temperature and humidity from the telephone set.

A description will be given of the service control procedure for this service. First, the user inputs a service code from a service key or a function key of the telephone set so as to specify the service. Hence, the air conditioning/illumination/temperature and humidity control service is started. The started service program displays on the display of the telephone a message requesting input of a department code and a password. The user inputs the department code and password from a dial key pad in response to the message which is displayed on the display. The application processor checks the input department code and password and displays an air conditioning/illumination/temperature and humidity control menu on the display when the password is correct. In addition, the application processor displays on the display a message requesting input of the details of the air conditioning/illumination/temperature and humidity control. The user inputs the necessary control data in response to the control menu and the message displayed on the display. The application processor displays on the display a message requesting confirmation of the user's input. When the user confirms the user's input by an input from a key in response to the message which is displayed on the display, the application processor registers the confirmed control data and displays on the display a message which indicates that the registration is completed.

Figure 15A:
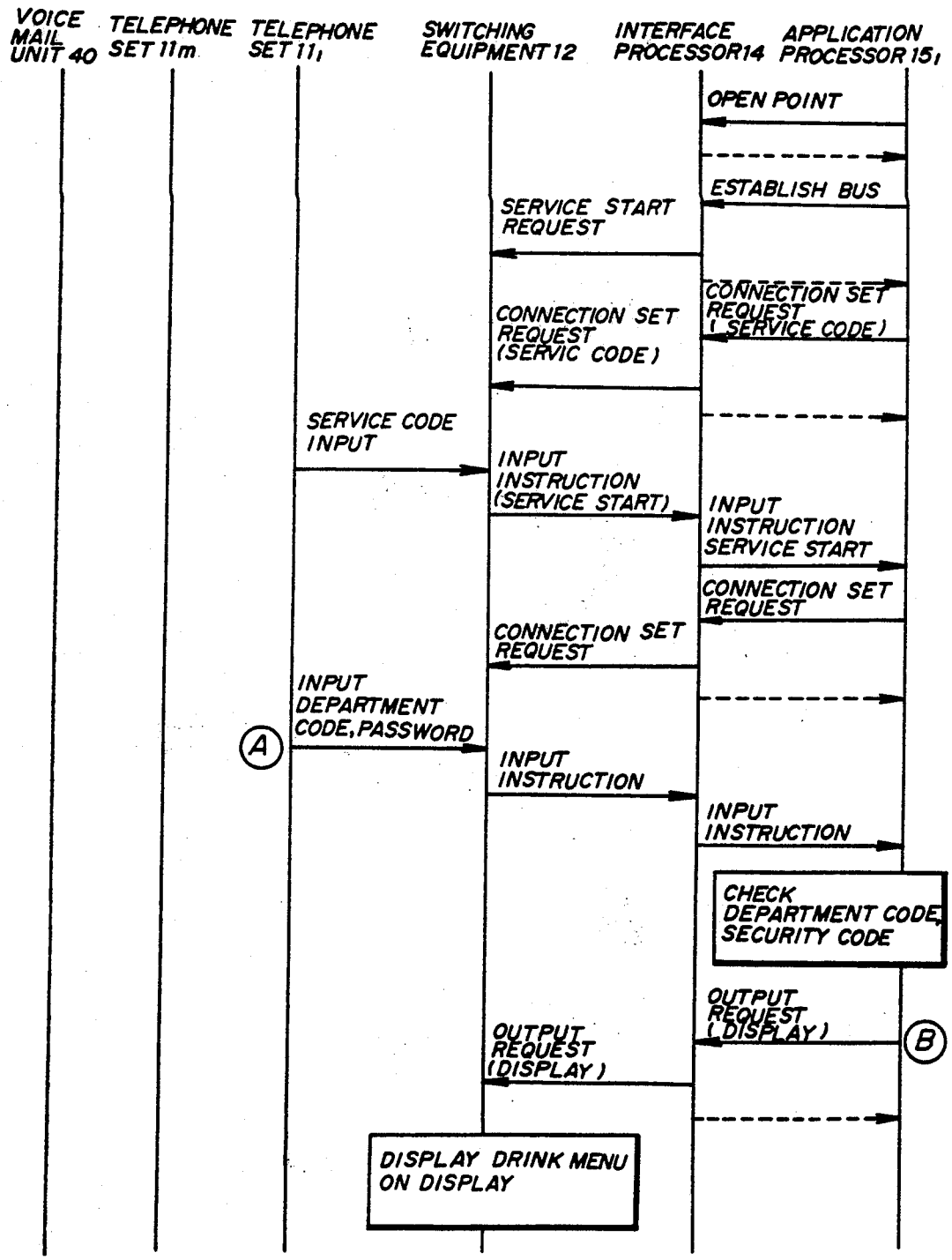
FIGS. 15A, 15B and 15C respectively are time charts for explaining service control procedures.
Figure 15B:
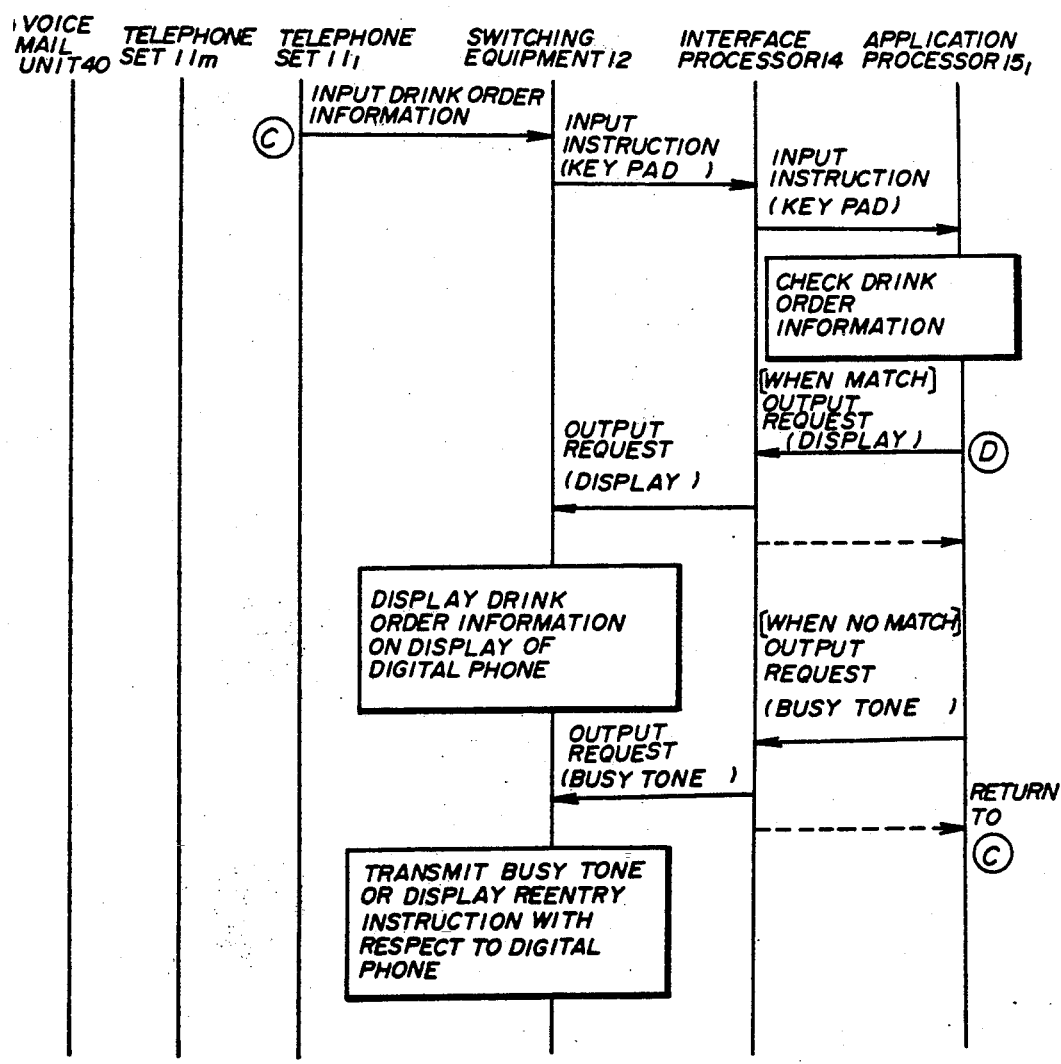
Figure 15C:
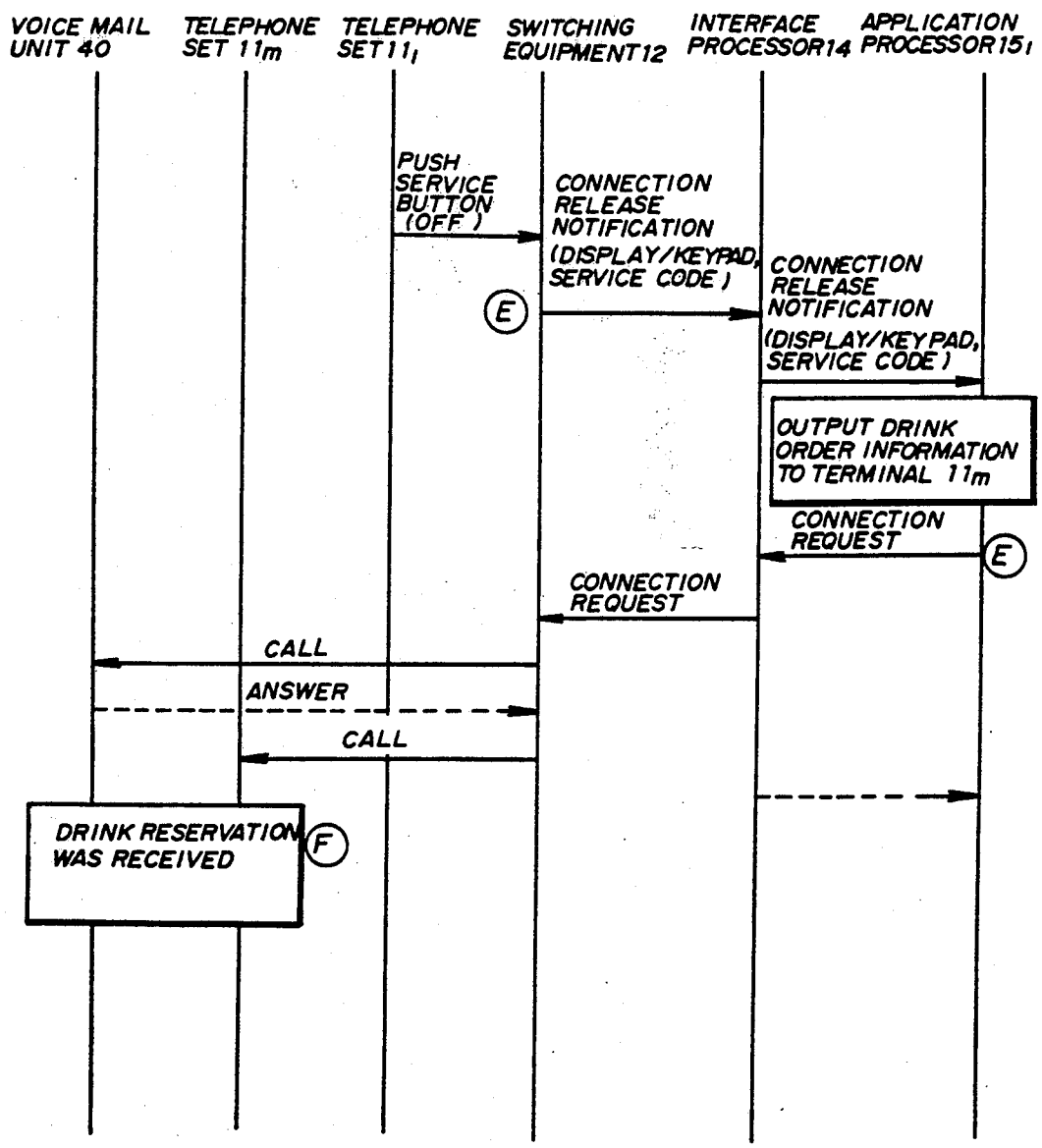

Next, a description will be given of a drink reservation service. The drink reservation service is a service in which an access is made from the telephone set to an application processor which forms a drink reservation system. FIG. 14 is a general block diagram for explaining the service control procedure for this service, and FIGS. 15A through 15C are time charts for explaining this service control procedure. In FIG. 14, those parts which are essentially the same as those corresponding parts in FIG. 11 are designated by the same reference numerals for the sake of convenience, and a description thereof will be omitted. In addition, in FIG. 14, the illustration of the line circuit 12-11 and the interface processor 14 is omitted for the sake of convenience.

First, the application processor $15_1$ opens point and establishes bus with respect to the interface processor 14, and the interface processor 14 makes a service start request with respect to the switching equipment 12. Next, a connection set request (service code input request) is made from the application processor $15_1$ to the switching equipment 12 via the interface processor 14. A user OPA who is in a location A turns a service key ON by key manipulation of the telephone set $11_1$ and inputs a service code for the drink reservation service. Accordingly, an input instruction (service start instruction) is transmitted from the switching equipment 12 to the application processor $15_1$ via the interface processor 14. The application processor $15_1$ makes a connection set request with respect to the switching equipment 12 via the interface processor in response to the input instruction.

Next, the user OPA in the location A inputs a department code and a password from the telephone set $11_1$ ((Ⓐ)). For example, by providing a card reader (not shown) on the telephone set $11_1$, the user OPA can input the department code and the password by making the card reader read his ID card. An input instruction is transmitted from the switching equipment 12 to the application processor $15_1$ via the interface processor 14 in response to the input from the telephone set $11_1$. The application processor $15_1$ checks the input department code and password and makes an output request to the switching equipment 12 via the interface processor 14 when the password is correct. Thus, a drink menu is displayed on the display of the telephone set $11_1$ ((Ⓑ)).

The user OPA inputs drink order information by a key manipulation of the telephone set $11_1$ while monitoring the drink menu ((Ⓒ)). This order information includes the kind and number of drinks, for example. The switching equipment 12 transmits an input instruction corresponding to the input order information to the application processor $15_1$ via the interface processor 14. For example, the application processor $15_1$ checks the order information from the input dial digit number. When no problem exists in the order information as a result of this check, the application processor $15_1$ makes an output request to the switching equipment 12 via the interface processor 14, and displays the drink order information on the display of the telephone set $11_1$ so as to request confirmation by the user OPA ((Ⓓ)). On the other hand, when a problem exists in the order information as a result of the check, the application processor $15_1$ makes an output request to the switching equipment 12 via the interface processor 14 so as to transmit a busy tone to the telephone set $11_1$ or display on the display a message requesting reentry of order information. When the user OPA makes the reentry of the order information, the operation returns to the inputting of the drink order information by the key manipulation described above.

When the user OPA finishes confirming the displayed drink order information, the service key of the telephone set $11_1$ is turned OFF. As a result, a connection release notification is transmitted from the switching equipment 12 to the application processor $15_1$ via the interface processor 14 ((Ⓔ)). The application processor $15_1$ outputs the drink order information with respect to a telephone set $11_m$ in a location B in response to the connection release notification. For this reason, a connection request is transmitted from the application processor $15_1$ to the switching equipment 12 via the interface processor 14 ((Ⓔ)). In addition, the switching equipment 12 calls a voice mail unit 40. As a result, the voice mail unit 40 and the telephone set $11_m$ in the location B are connected and the telephone set $11_m$ is called. When a user OPB receives the call on the telephone set $11_m$, a voice message such as "drink reservation was received" is received from the voice mail unit 40 ((Ⓕ)). The user OPB who listens to this voice message provides the drink service while monitoring the drink order information which is displayed on the display of the telephone set $11_m$.

Further, the present invention is not limited to these embodiments, but various variations and modifications may be made without departing from the scope of the present invention.

As described above, the switching system for application services according to the present invention is extremely useful from the practical point of view in that a plurality of application services can be received at a terminal.

We claim:

1. A switching system for application services, comprising:
   at least one application processor which stores a plurality of application programs for providing a plurality of application services,
   a telephone terminal comprising
      specifying means for specifying one arbitrary application service out of the plurality of application services by providing specifying information,
      a display,
      a first memory area for storing display information for an application service,
      a second memory area for storing display information for call control,
      display switching means operatively coupled to said first and second memory areas and said display for switching between the display for application service and the display for call control, and
      selective storage means operatively coupled to said display switching means and said display for storing display information for an application service in said first memory area and for storing display information for call control in said second memory area based on display identification information transmitted from said switching equipment to identify whether the display information is for an application service or call control, and
   switching equipment for coupling said terminal and said application processor comprising receiving means for receiving specifying information from said specifying means indicative of the one arbitrary application service, and transferring means for transferring to said application processor the specifying information and for transferring to said selective storage means of said telephone terminal the display identification information to identify whether the display information to be displayed on said display is for an application service or call control.

2. A switching system for application services as claimed in claim 1, wherein a single application processor stores the plurality of application programs.

3. A switching system for application services as claimed in claim 1, wherein said application processor comprises selecting means for selecting an application program which corresponds to the one arbitrary application service based on the specifying information.

4. A switching system for application services as claimed in claim 1, wherein said telephone terminal is a telephone set.

5. A switching system for application services as claimed in claim 4, wherein said specifying means of said telephone set comprises input key means including dial keys.

6. A switching system for application services as claimed in claim 4, wherein said application processor comprises means for displaying a message on said display of a telephone set based on the specifying information.

7. A switching system for application services as claimed in claim 4, wherein said switching system for application services comprises a plurality of said application processors, and an interface processor operatively coupled to said plurality of application processors and said telephone set to exclusively control connection between said telephone set and said plurality of application processors.

8. A switching system for application services as claimed in claim 7, wherein said specifying means of said telephone set comprises devices including at least one lamp and associated button keys.

9. A switching system for application services as claimed in claim 8, wherein said interface processor comprises a management table which registers an exclusive flag indicative of a state of each of said devices and a necessity of exclusive control in correspondence with each device of said devices of said telephone set.

10. A switching system for application services as claimed in claim 9, wherein said interface processor comprises first retrieving means for retrieving data from said management table when an input is received from one of said devices of said telephone set via said switching equipment and for exclusively notifying only the application processor corresponding to a telephone set of said one of said devices, and second retrieving means for retrieving data from said management table when an output request to said one of said devices is received from said application processor and for outputting to said one of said devices by exclusively notifying said switching equipment when said application processor that the output request was received from corresponds to a telephone set of said one of said devices.

11. A switching system for application services as claimed in claim 4, wherein said switching system for application services comprises a plurality of said application processors, and wherein said switching equipment comprises an interface processor operatively coupled to said plurality of application processors and said telephone set to exclusively control connection between said telephone set and said plurality of application processors.

* * * * *

UNITED STATES PATENT AND TRADEMARK OFFICE
CERTIFICATE OF CORRECTION

PATENT NO. : 5,195,129
DATED : March 16, 1993
INVENTOR(S) : Yazawa et al.

It is certified that error appears in the above-identified patent and that said Letters Patent is hereby corrected as shown below:

Col. 4, line 49, "cation" should be --application--;

Col. 5, line 40, "processor" should be --processor 4--;

Col. 13, line 41, after "registration" insert --related--; line 49, "13" should be -- 13 --;

line 45, "14" should be -- ⑭ --;
    line 49, "15" should be -- ⑮ --;
    line 57, "21" should be -- ㉑ --;
    line 58, "24" should be -- ㉔ --;
    line 59, "21" should be -- ㉑ --;
    line 62, "22" should be -- ㉒ --;
    line 64, "22" should be -- ㉒ --;
    line 66, "21" should be -- ㉑ --;
    line 68, "the=judgement" should be --the judgement--, and "22" should be -- ㉒ --.

Col. 14, line 1, "23" should be -- ㉓ --;
    line 3, "22" should be -- ㉒ --;
    line 5, "24" should be -- ㉔ --;
    line 8, "23" should be -- ㉓ --;
    and "24" should be -- ㉔ --;

UNITED STATES PATENT AND TRADEMARK OFFICE
CERTIFICATE OF CORRECTION

PATENT NO.   :   5,195,129
DATED        :   March 16, 1993
INVENTOR(S)  :   Yazawa et al.

It is certified that error appears in the above-identified patent and that said Letters Patent is hereby corrected as shown below:

line 10, "23" should be -- ㉓ --;
line 13, "24" should be -- ㉔ --;
line 17, "31" should be -- ㉛ -- and "34" should be -- ㉞ --;
line 21, "32" should be -- ㉜ --;
line 23, "32" should be -- ㉜ --;
line 27, "41" should be -- ㊶ --;
line 28, "32" should be -- ㉜ --;
line 29, "33" should be -- ㉝ --;
line 34, "34" should be -- ㉞ --.

Signed and Sealed this

Twenty-second Day of February, 1994

Attest:

BRUCE LEHMAN

*Attesting Officer*     *Commissioner of Patents and Trademarks*